(12) United States Patent
Hosoya et al.

(10) Patent No.: US 8,495,288 B2
(45) Date of Patent: Jul. 23, 2013

(54) STORAGE CONTROLLER AND DUPLICATED DATA DETECTION METHOD USING STORAGE CONTROLLER

(75) Inventors: Mutsumi Hosoya, Odawara (JP); Hiroshi Kanayama, Odawara (JP); Wataru Mineta, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 994 days.

(21) Appl. No.: 12/136,108

(22) Filed: Jun. 10, 2008

(65) Prior Publication Data

US 2009/0254507 A1   Oct. 8, 2009

(30) Foreign Application Priority Data

Apr. 2, 2008   (JP) ................. 2008-096049

(51) Int. Cl.
*G06F 13/00*   (2006.01)
*G06F 12/00*   (2006.01)

(52) U.S. Cl.
USPC .... 711/112; 711/162; 711/216; 711/E12.002; 707/664

(58) Field of Classification Search
USPC ........... 711/112, 162, 216, E12.002; 707/664
See application file for complete search history.

(56) References Cited

U.S. PATENT DOCUMENTS

| 2007/0266059 | A1 | 11/2007 | Kitamura | |
|---|---|---|---|---|
| 2008/0005141 | A1* | 1/2008 | Zheng et al. | 707/101 |
| 2013/0007000 | A1* | 1/2013 | Indeck et al. | 707/741 |

FOREIGN PATENT DOCUMENTS

| JP | 2005-228245 | 8/2005 |
|---|---|---|
| JP | 2007-305122 | 11/2007 |

* cited by examiner

*Primary Examiner* — Edward Dudek, Jr.
(74) *Attorney, Agent, or Firm* — Hitachi America, Ltd.

(57) ABSTRACT

A storage controller of the present invention narrows down the target for data comparison by comparing hash codes beforehand and rapidly detects duplicated data. A hash value setting unit sets a hash code in data received from a host. Hash code-attached data is stored in a logical volume. A microprocessor unit compares the hash codes for each comparison-targeted data. When hash codes match with one another, a data comparator compares the target data, and determines whether or not the data is duplicated data. When duplicated data is detected, the microprocessor unit removes the duplicated data.

6 Claims, 26 Drawing Sheets

STORAGE CONTROLLER AND DUPLICATED DATA DETECTION METHOD USING STORAGE CONTROLLER

CROSS-REFERENCE TO RELATED APPLICATIONS

This application relates to and claims priority from Japanese Patent Application No. 2008-096049 filed on Apr. 2, 2008, the entire disclosure of which is incorporated herein by reference.

BACKGROUND OF THE INVENTION

1. Field of the Invention

The present invention relates to a storage controller and a duplicate data detection method that uses the storage controller.

2. Description of the Related Art

Companies and the like use relatively large-scale storage controllers to manage increasingly larger amounts of data. As such a storage controller, a device that is configured to enable the DMA (Direct Memory Access) transfer of data between channel adapters, memory adapters and processor adapters is known (JP-A-2005-228245).

A storage controller also manages large amounts of duplicated data. Duplicated data, for example, is data the contents of which are exactly the same, such as an original file and a copy file. Large amounts of duplicated data result in the wasteful use of the storage areas of the storage controller, increasing the operating costs of the storage controller. Further, large amounts of duplicated data make it difficult for a user to quickly access needed data. Accordingly, technology designed to determine whether or not data is duplicated data based on hash values, and to only store data that is not duplicated data has been proposed (JP-A-2007-305122).

The prior art disclosed in the above-mentioned second Patent Document (JP-A-2007-305122) removes duplicated data on the basis of hash values. However, in this prior art, a microprocessor compares data by reading comparison-targeted data into a local memory inside the microprocessor. Since the microprocessor is respectively used to detect duplicated data and to remove duplicated data, the response performance of the storage controller deteriorates.

SUMMARY OF THE INVENTION

With the foregoing in view, an object of the present invention is to provide a storage controller and a duplicated data detection method using the storage controller that makes it possible to detect and remove duplicated data while preventing response performance deterioration. Further objects of the present invention should become clear from the descriptions of the embodiments explained hereinbelow.

A storage controller according to a first aspect of the present invention for solving the above-mentioned problem is a storage controller that comprises a first communications controller for carrying out data communications with a host computer, a second communications controller for carrying out data communications with a storage device, a cache memory that is used in the exchange of data between the first communications controller and the second communications controller, and a controller for controlling the first communications controller, the second communications controller and the cache memory respectively, this storage controller further comprising a determination data setting unit for setting, in respective data, determination data for making a primary determination as to whether or not the respective data matches with the other data; a duplicated data detector, which is for detecting whether or not a plurality of prescribed data is duplicated data, and which comprises a primary determination unit that makes a primary determination as to whether or not the respective prescribed data match with one another by comparing the respective determination data set in the respective prescribed data, and a secondary determination unit that compares the respective prescribed data and makes a secondary determination as to whether or not the respective prescribed data is duplicated data when the primary determination unit makes a primary determination that the respective prescribed data match with one another; and a duplicated data processor that implements a preconfigured prescribed process for the duplicated data, when a secondary determination is that the respective prescribed data is duplicated data, wherein at least the determination data setting unit and the secondary determination unit are configured as dedicated circuits that are separate from the controller.

In a second aspect according to the first aspect, the duplicate data detector executes a primary determination by comparing the respective determination data set in the respective prescribed data when the respective prescribed data is transferred to the cache memory, and makes the secondary determination as to whether or not the respective prescribed data is duplicated data by respectively reading out from the cache memory and comparing the respective prescribed data when the primary determination is that the respective prescribed data match with one another.

In a third aspect according to the first aspect or the second aspect, the duplicated data processor stores only one data of the duplicated data, and deletes the other data of the duplicated data.

In a fourth aspect according to the first aspect or the second aspect, the duplicated data processor stores only one data of the duplicated data, and sets link information to the one data in the other data of the duplicated data.

In a fifth aspect according to the first aspect or the second aspect, the duplicated data processor transfers any newer data of the respective prescribed data to a prescribed storage area when the respective prescribed data is not the duplicated data.

In a sixth aspect according to any of the first through the fifth aspects, the determination data setting unit is provided in either one or both of the first communications controller and the second communications controller, and the primary determination unit is provided in the controller, and the secondary determination unit is provided in any one or a plurality of the first communications controller, the second communications controller, the cache memory and the controller.

In a seventh aspect according to any of the first through the sixth aspects, the setting of determination data by the determination data setting unit, the detection of the duplicated data by the duplicated data detector, and the execution of the prescribed processing by the duplicated data processor are respectively executed in the each storage device.

In an eighth aspect according to any of the first through the seventh aspects, the respective prescribed data is any of a plurality of data received from a host computer or a plurality of data read out from a storage device, or data received from the host computer and data read out from the storage device.

A method according to a ninth aspect of the present invention is a method for detecting duplicated data by using a storage controller that controls data communications between a host computer and a storage device, and executes a step of using a dedicated circuit to set, in respective data, determination data for making a primary determination as to whether or not the respective data coincides with other data; a step of transferring to and storing in cache memory a plurality of prescribed data targeted for comparison; a step of making a primary determination by comparing whether or not respective determination data created for the respective prescribed data match with one another; a step of making a secondary determination as to whether or not the respective prescribed data is duplicated data by inputting the respective prescribed data into a comparison circuit and making a comparison thereof when the primary determination is that the determination data match with one another; and a step of implementing a preconfigured prescribed process for either any one or all of the respective prescribed data when the secondary determination is that the respective prescribed data is duplicated data.

At least a portion of the respective units and respective steps of the present invention may be able to be realized via a computer program. Such a computer program, for example, is either stored in a storage device, or distributed via a communication network.

DESCRIPTION OF THE PREFERRED EMBODIMENTS

Figure 1:
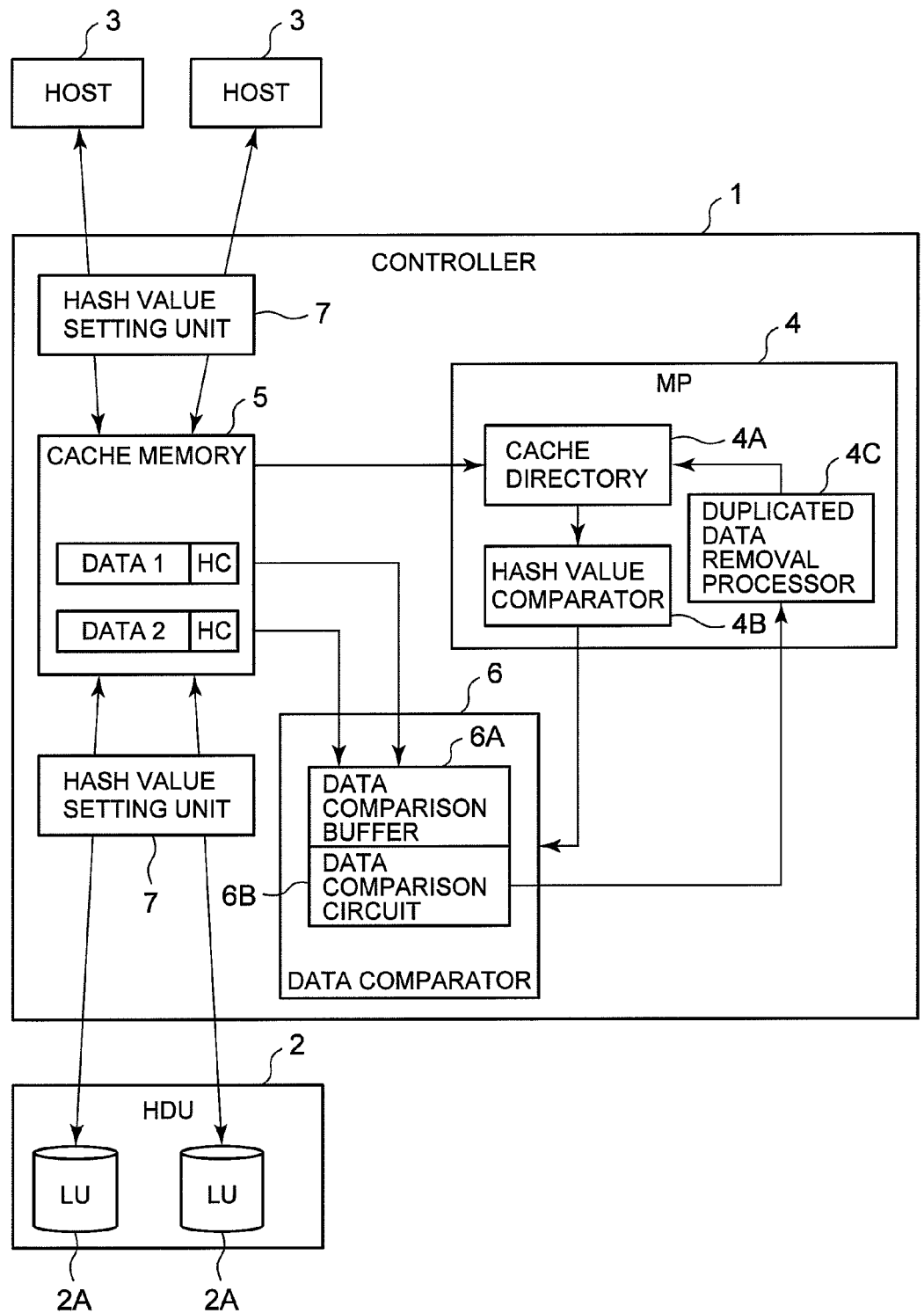
FIG. 1 is a schematic diagram showing the overall concept of an embodiment of the present invention.

FIG. 1 is a schematic diagram showing an overview of an embodiment of the present invention. The configuration shown in FIG. 1 depicts an overview of the present invention to the extent necessary to understand and implement the present invention, and the scope of the present invention is not limited to the configuration shown in FIG. 1.

The information processing system shown in FIG. 1, for example, comprises a controller 1; a storage device unit 2; and a host computer 3. In the following explanation, host computer will be abbreviated as host.

Firstly, the host 3 and storage device unit (Abbreviated as "HDU" in the figure. HDU is the abbreviation for Hard Disk drive Unit.) 2 will be explained, and the controller 1 will be explained last. Furthermore, in the following explanation, the storage device unit will be abbreviated as HDU.

The host 3, for example, is configured as a computer device, such as a server computer, mainframe computer, or personal computer. The host 3, for example, can also be called a "higher-level device". The host 3, for example, is connected to the controller 1 via a communication network such as a FC_SAN (Fibre Channel_Storage Area Network) or IP_SAN (Internet Protocol_SAN). The host 3 accesses a desired logical volume 2A via the controller 1 and carries out the reading and writing of data.

The HDU2 is a device for maintaining either one or a plurality of logical volumes 2A as "storage devices" The HDU2 is connected to the controller 1 via a communication network such as a FC_SAN or IP_SAN. As will be described hereinbelow using FIG. 2, for example, a logical volume 2A, which is a logical storage device, is created using a physical storage device such as a hard disk drive or flash memory device.

The controller 1 as "storage controller", for example, as will be explained hereinbelow using FIG. 3, can be configured to comprise a circuit (FEPK110) for carrying out communications with the host 3; a circuit (BEPK120) for carrying out communications with the HDU2; a circuit (CMPK140) for caching data; and a control circuit (MPPK130).

In FIG. 1, the focus is on controller 1-realized functions related to the present invention. The controller 1, for example, comprises a microprocessor unit 4 as the "controller"; a cache memory 5; a data comparator 6 as the "secondary determination unit"; and a hash value setting unit 7 as the "determination data setting unit".

The microprocessor unit 4, for example, comprises a cache directory 4A; a hash value comparator 4B; and a duplicated data removal processor 4C. The cache directory 4A manages what data is stored in which area of the cache memory 5. The cache memory 5 stores data and the hash value of this data (abbreviated as HC in the figure). A hash value is also managed in the cache directory.

The hash value comparator 4B as the "primary determination unit" compares whether or not hash values respectively set for a comparison-targeted plurality of prescribed data match with one another. When the hash values match, these respective prescribed data are examined by the data comparator 6. Furthermore, the matching up of hash values signifies that there is a high likelihood that the comparison-targeted plurality of prescribed data is duplicated data. Therefore, in addition to a situation in which two hash values match completely, the matching of hash values can also include a situation in which two hash values are approximate.

When, as a result of examination, it is determined that the contents of the respective prescribed data match with one another and they are duplicated data, the duplicated data removal processor 4C as the "duplicated data processor" implements a preconfigured prescribed process for the duplicated data. The prescribed process, as will be described hereinbelow, for example, can include a process for discarding any one data of the two duplicated data; a process for rewriting the contents of the new data of the two duplicated data in a link to the old data; and a process for copying only the data that is not duplicated.

The cache memory 5 is for temporarily storing data received from the host 3 and data read out from the logical volume 2A. As described hereinabove, the cache directory 4A manages what data is stored where in the cache memory 5.

The data comparator 6, for example, comprises a data comparison buffer 6A; and a data comparison circuit 6B. The data comparison buffer 6A is a memory for temporarily storing comparison-targeted data. The data comparison circuit 6B is for comparing in prescribed size units whether or not the respective comparison-targeted data match with one another, and for outputting the comparison result thereof. A comparison result by the comparison circuit 6B is inputted to the duplicated data removal processor 4C.

The hash value setting unit 7 can be respectively provided in a circuit that receives data from the host 3 (for example, FEPK110) and a circuit that receives data from a logical volume 2A (for example, BEPK120). The hash value setting unit 7 inputs received data to a previously prepared hash function to calculate the hash value of this received data.

Next, an example of the operation of the configuration shown in FIG. 1 will be explained. When the host 3 specifies a logical volume 2A and issues a write command, the hash value setting unit 7 provided in the host 3 side sets a hash value in the write data received from the host 3. The cache memory 5 stores the data in which the hash value has been set. The hash value-attached data stored in the cache memory 5 is written to the logical volume 2A.

When a prescribed timing arrives, the controller 1 determines whether or not the comparison-targeted plurality of prescribed data is duplicated data. The prescribed timing can include the time when the user indicates an execution; the time when data is backed up; and the time when data is remote copied. Further, for example, the configuration can be such that the controller 1 automatically decides when a duplicated data determination is made, such as when a prescribed time has elapsed since the previous determination process, when more than a prescribed amount of data has been written to the logical volume 2A since the previous determination process, or when a pre-specified time arrives.

The hash value comparator 4B of the microprocessor unit 4 determines whether or not there is a high likelihood the respective prescribed data is duplicated data by comparing the hash values, which have respectively been made correspondent to the comparison-targeted respective prescribed data.

When the hash value comparator 4B determines that an examination is necessary, the respective prescribed data is compared by the data comparator 6 and examined as to whether or not this data is duplicated data. The examination result is notified to the microprocessor unit 4 from the data comparator 6. The duplicated data removal processor 4C implements a preconfigured prescribed process for the data that has been determined to be duplicated data. The prescribed process will be explained further hereinbelow.

Configuring this embodiment like this narrow down the target for which data comparison is carried out using a hash value-based primary determination, and implements a prescribed process for duplicated data. Therefore, the scope of the data to be compared by the data comparator 6 can be narrowed, making it possible for the microprocessor unit 4 to implement the prescribed process only when the prescribed data has been determined to be duplicated data by the data comparator 6. As a result of this, this embodiment can relieve the load placed on the microprocessor unit 4, and can detect duplicated data and implement the prescribed process while preventing response performance from deteriorating. The embodiments of the present invention will be explained in detail hereinbelow.

Embodiment 1

Figure 2:
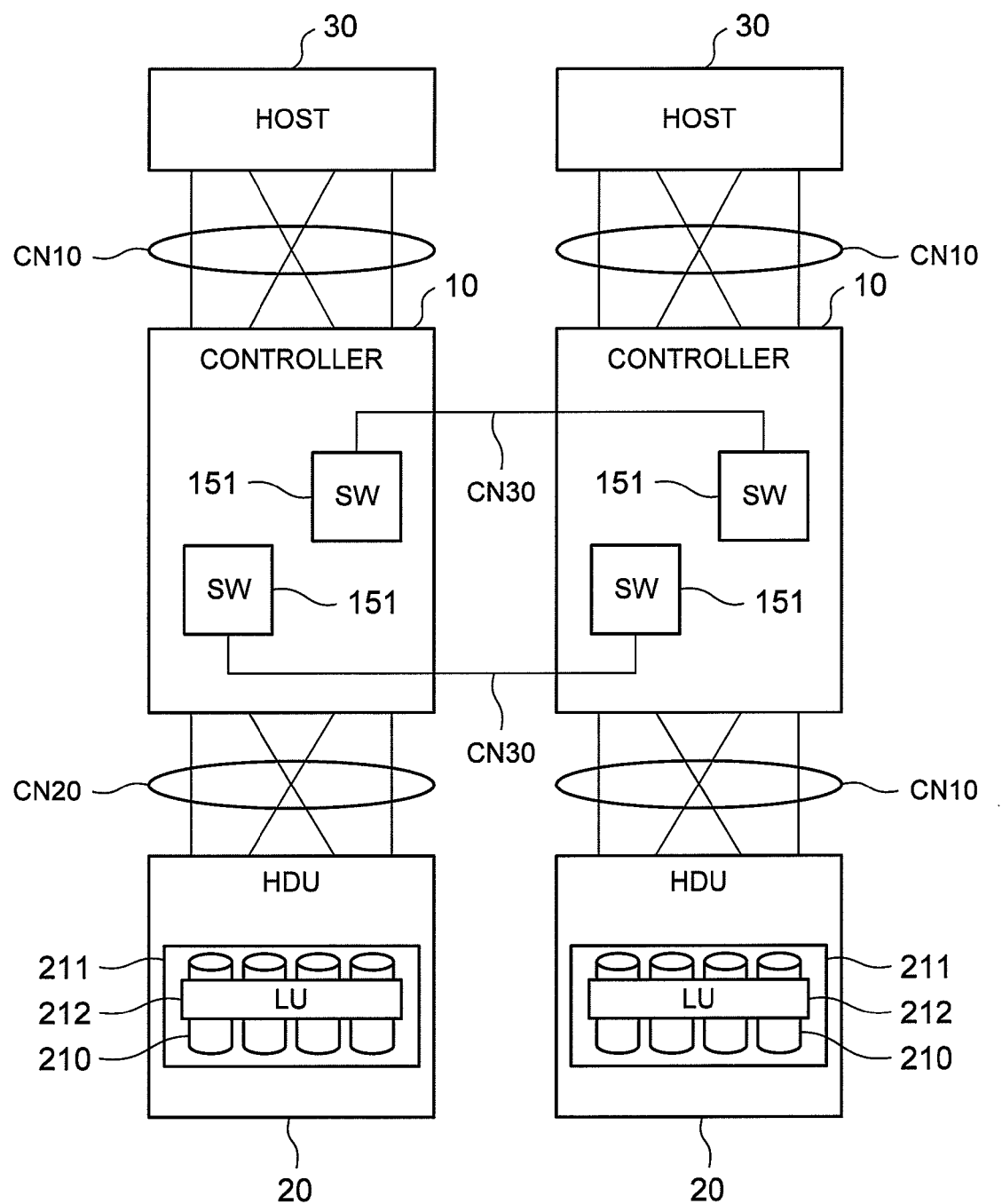
FIG. 2 is a block diagram of a system comprising a storage controller related to a first embodiment.

FIG. 2 is a schematic diagram showing an overall outline of an information processing system according to this embodiment. This system, for example, comprises a controller 10; a HDU20; and a host 30. The controller 10 corresponds to the controller 1 in FIG. 1, the HDU20 corresponds to the HDU2 in FIG. 1, and the host 30 corresponds to the host 3 in FIG. 1, respectively.

The host 30 and the controller 10 are communicatively interconnected via a communication network CN10. The HDU20 and the controller 10 are communicatively interconnected via a communication network CN20. The respective communication networks CN10, CN20, for example, are configured as FC_SAN or IP_SAN.

A plurality of controllers 10 can also be linkedly used. As shown in FIG. 2, switching circuits 151 inside the respective controllers 10 are connected via a communication network CN30, thereby making it possible for the one controller 10 to carry out processing for data inside the other controller 10. For example, if a failure occurs in the controller 10 on the left side of the figure, the controller 10 on the right side of the figure can access data managed by the left-side controller 10 and can carry out a duplicated data detection process or a duplicated data removal process. The controller 10 will be described in detail using FIG. 3.

The HDU20 comprises a plurality of disk drives 210. Hard disk drives will be given as examples in the following explanation, but the present invention is not limited to hard disk drives.

As a physical storage device, for example, a variety of devices capable of reading and writing data can be used, such as a hard disk device, a semiconductor memory device, an optical disk device, a magneto-optical disk device, a magnetic tape device, and a flexible disk device. When a hard disk device is used, for example, and FC (Fibre Channel) disk, SCSI (Small Computer System Interface) disk, SATA disk, ATA (AT Attachment) disk, and SAS (Serial Attached SCSI) disk can be utilized.

When a semiconductor memory device is used, for example, various memory devices, such as a flash memory, FeRAM (Ferroelectric Random Access Memory), MRAM (Magnetoresistive Random Access Memory), Ovonic Unified Memory, and RRAM (Resistance RAM) can be utilized.

A single RAID group (may also be called a parity group) 211 is created by a plurality of disk drives 210. The RAID group 211 is created by virtualizing physical storage areas of respective disk drives 210 in accordance with a RAID level.

Either one or a plurality of logical volumes 212 of either a prescribed size or an arbitrary size can be provided in the physical storage area of the RAID group 211. A logical volume 212 is displayed as "LU" in the figure. The logical volume 212 can also be called a logical storage device.

Figure 3:
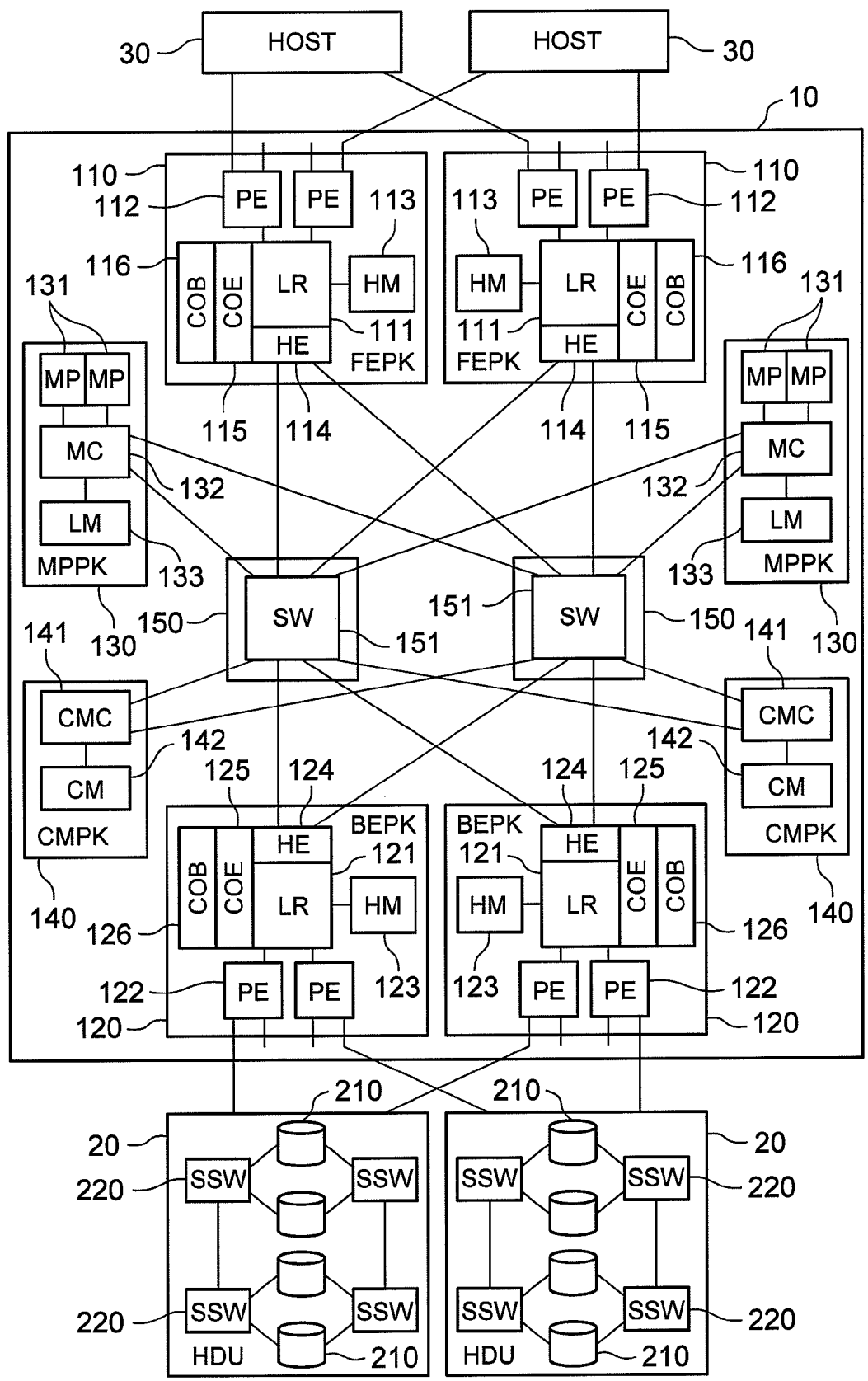
FIG. 3 is a block diagram of a controller.

FIG. 3 is a block diagram showing a detailed view of the controller 10. The controller 10, as will be explained hereinbelow, comprises a plurality of types of control packages 110, 120, 130, 140 and 150.

A front-end package 110 (FEPK110 in the figure) is the control package in charge of communications with the host 30, and corresponds to the "first communications controller". The FEPK110 can also be called a channel adapter. The FEPK110, for example, comprises a local router 111 (LR111 in the figure); a protocol control chip 112 (PE112 in the figure); and a channel memory 113 (HM113 in the figure).

The local router 111 controls the operation of the FEPK110. The protocol control chip 112 carries out communications with the host 30. The channel memory 113 temporarily stores data received from the host 30 and data read in from the cache memory 142.

The local router 111 can comprise a hash code creation circuit 114 (HE114 in the figure); a comparison circuit 115 (COE115 in the figure); and a comparison buffer 116 (COB116 in the figure). The hash code creation circuit 114 corresponds to the hash value setting unit 7 of the host side shown in FIG. 1. The comparison circuit 115 corresponds to the data comparison circuit 6B of FIG. 1. The comparison buffer 116 corresponds to the data comparison buffer 6A of FIG. 1.

The hash code creation circuit 114 respectively calculates hash codes (also called hash values) for each prescribed size for data received from the host 30, and makes the calculated hash codes correspond to the data. The one data of the two data targeted for comparison is stored in the comparison buffer 116. The comparison circuit 115 is for comparing data read out from the comparison buffer 116 against data read out from the cache memory 142, and outputting the result of this comparison.

A back-end package 120 (BEPK120 in the figure) is the control package for carrying out communications with the respective disk drives 210 inside the HDU20, and corresponds to the "second communication controller". The back-end package 120 can also be called a disk adapter. The back-end package 120 can be configured the same as the front-end package 110.

That is, the BEPK120, for example, comprises a local router 121 (LR121 in the figure); a protocol control chip 122 (PE122 in the figure); and a channel memory 123 (HM123 in the figure).

The local router 121 controls the operation of the BEPK 120. The protocol control chip 122 carries out communications with the disk drives 210. The channel memory 123 temporarily stores data read out from a disk drive 210 and data read in from the cache memory 142.

The same as described for the FEPK110, the local router 121 comprises a hash code creation circuit 124 (HE124 in the figure); a comparison circuit 125 (COE125 in the figure); and a comparison buffer 126 (COB126 in the figure). The hash code creation circuit 124 corresponds to the hash value setting unit 7 of the logical volume side shown in FIG. 1. The comparison circuit 125 corresponds to the data comparison circuit 6B of FIG. 1. The comparison buffer 126 corresponds to the data comparison buffer 6A of FIG. 1.

The hash code creation circuit 124 respectively calculates hash codes for each prescribed size for data read out from a disk drive 210, and makes the calculated hash codes correspond to the data. The one data of the two data targeted for comparison is stored in the comparison buffer 126. The comparison circuit 125 is for comparing data read out from the comparison buffer 126 against data read out from the cache memory 142, and outputting the result of this comparison.

Furthermore, in the example shown in FIG. 3, there is depicted a situation in which both the FEPK110 and BEPK120 comprise hash code creation functions and data comparison functions. Any of the functions inside either the FEPK110 or the BEPK120 are used as needed.

A microprocessor package 130 (MPPK130 in the figure) is the control package for controlling the operations inside the controller 10, and corresponds to the "controller". The microprocessor package 130 corresponds to the microprocessor unit 4 of FIG. 1. The MPPK130, for example, comprises a microprocessor 131 (MP131 in the figure); a processor memory controller 132 (MC132 in the figure); and a processor memory 133 (LM133 in the figure).

The microprocessor 131 implements a duplicated data removal process or a copy process by reading in and executing a prescribed program code. The processor memory controller 132 controls the processor memory 133.

A cache memory package 140 (CMPK140 in the figure) is the package for temporarily storing data received from the host 30 or a disk drive 210. The cache memory package 140, for example, comprises a cache memory controller 141 (CMC141 in the figure); and a cache memory 142 (CM142 in the figure). The cache memory controller 141 controls the cache memory 142.

A switching package 150 (hereinafter, will also be called the SWPK150) is the package for connecting the respective packages 110, 120, 130 and 140. The switching package 150 comprises a switching circuit 151.

The configuration of the HDU20 will be explained. The respective disk drives 210 are connected via disk drive switches 220 (SSW220 in the figure). The back-end package 120 can access a desired disk drive 210 via a disk drive switch 220 to carry out the reading and writing of data. The respective disk drives 210 can be accessed from two independent networks. Even if a failure should occur in the one network, the back-end package 120 can access the respective disk drives 210 from the other network.

Furthermore, as shown in FIG. 3, one controller 10 comprises a plurality of each of the same function packages. That is, the respective functions of the controller 10 (host communications function, disk drive communications function, caching function, control function, and switching function) are made redundant. Therefore, even if any one package for realizing the same function should fail, processing can be executed using the other package.

Figure 4:
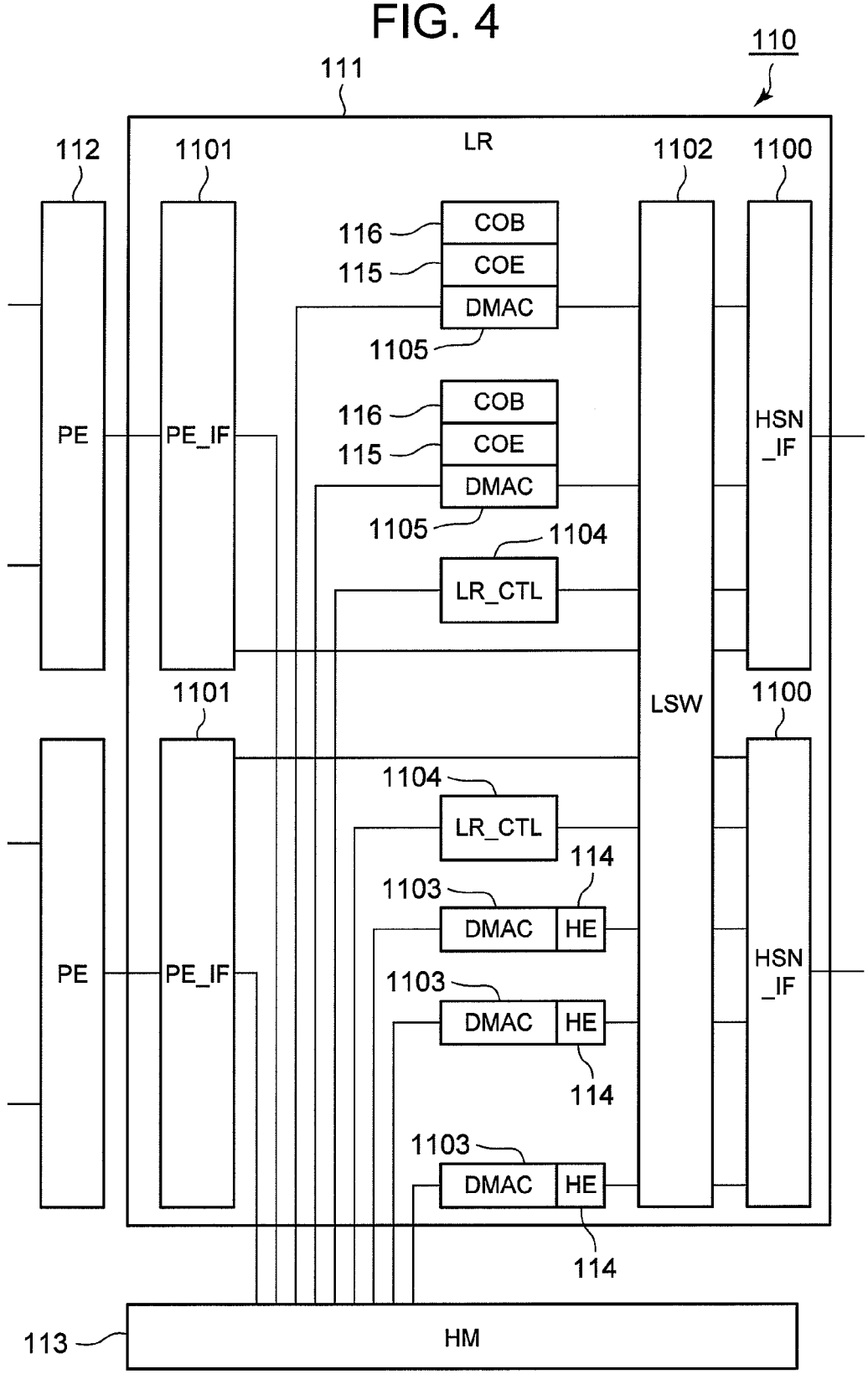
FIG. 4 is a block diagram of a local router.

FIG. 4 is a block diagram showing the detailed configuration of the front-end package 110. Furthermore, the detailed configuration of a DMA controller 1105 will be described hereinbelow using FIG. 10. In FIG. 4, the local router 111, for example, comprises an internal network interface 1100 (HSN_IF1100 in the figure); a protocol control chip interface 1101 (PE_IF1101 in the figure); an internal switch 1102 (LSW1102 in the figure); a first DMA controller 1103 (DMAC1103 in the figure); a local router control circuit 1104 (LR_CTL1104 in the figure); a second DMA controller 1105 (DMAC1105 in the figure); a comparison circuit 115; and a comparison buffer 116.

The internal network interface 1100 is an interface circuit for connecting the local router 111 to the switching circuit 151. The respective DMA controllers 1103, 1105 inside the local router 111 are connected to the switching circuit 151 via the internal switch 1102 and the internal network interface 1100, and furthermore, are connected to the cache memory 142 via the switching circuit 151.

The protocol control chip interface 1101 is an interface circuit for connecting to the protocol control chip 112. The local router 111 is connected to the host 30 via the protocol control chip interface 1101 and the protocol control chip 112.

The first DMA controller 1103 is used for transferring data to the cache memory 142. Data received from the host 30 (write-data) is stored once in the channel memory 113, and inputted to the first DMA controller 1103. The write-data is transferred via DMA to the cache memory 142 by way of the first DMA controller 1103. When carrying out a DMA transfer of the write-data to the cache memory 142, the hash code creation circuit 114, for example, respectively creates hash codes for each logical block, and makes the hash codes correspond to the respective logical blocks. The local router control circuit 1104 shown in the lower portion of FIG. 4 controls the transfer of the write-data received from the host 30 to the cache memory 142.

The second DMA controller 1105 is used to read out from the cache memory 142 a plurality of data for which the hash codes match with one another. A determination is made by the comparison circuit 115 as to whether or not the plurality of data read out from the cache memory 142 match. The determination result is notified to the microprocessor 131.

As shown in FIG. 4, a plurality of DMA controllers 1103, 1105 are provided in this embodiment, making it possible to parallelly carry out a plurality of DMA transfers.

Figure 5:
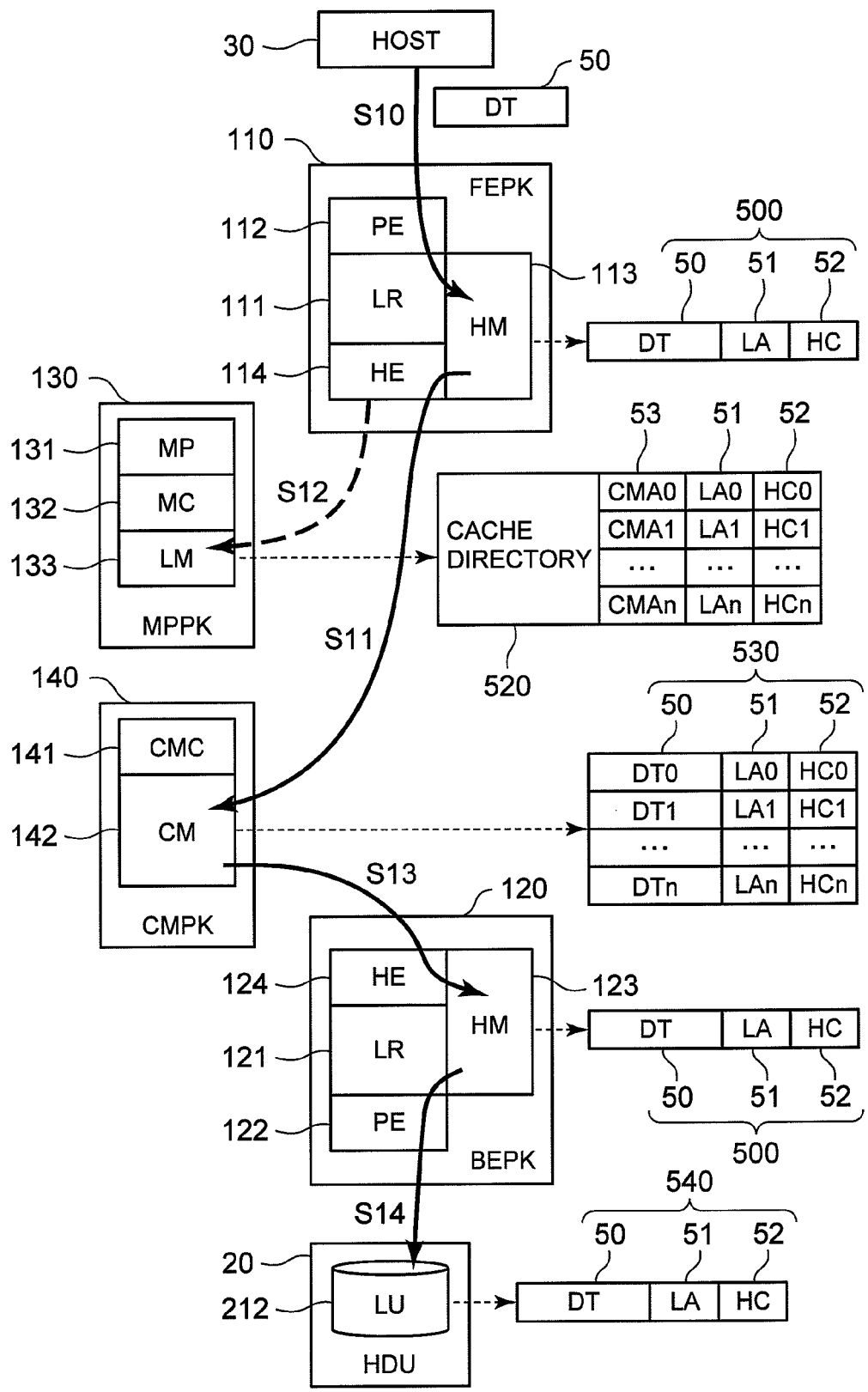
FIG. 5 is a schematic diagram showing how to write write-data from a host to a volume.

The processing of the write-data received from the host 30 will be explained by referring to FIGS. 5 and 6. FIG. 5 is a schematic diagram showing the movement of data flowing between the respective packages. First, an overview of an operation will be explained using FIG. 5. The dark line in FIG. 5 shows the flow of data. For convenience of explanation, for example, a situation in which only one 512-byte logical block is received will be explained hereinbelow.

Write-data 50 (DT50 in the figure) received from the host 30 is stored in the channel memory 113 inside the FEPK110 (S10). The hash code creation circuit 114 creates a hash code 52 (HC52 in the figure) based on the write-data.

A write-destination logical address 51 (LA51 in the figure) and the hash code 52 are respectively made correspondent to the write-data 50. That is, the write-data 50 received from the host 30 is converted to hash code-attached channel memory data 500 by the FEPK110. When the write-date 50 is configured from a plurality of logical blocks, a logical address 51 and hash code 52 are made correspondent to each logical block.

The hash code-attached write-data is transferred to the cache memory 142 inside the cache memory package 140 by way of the switching circuit 151 and stored in the cache memory 142 (S11). Consequently, hash code-attached cache data 530 is stored in the cache memory 142.

Furthermore, for ease of understanding, the reference numerals have been changed in FIG. 5, but the hash code-attached cache data 530 and the hash code-attached channel memory data 500 are substantially the same data.

The FEPK110 notifies the microprocessor package 130 of the hash code 52 related to the write-data received in S10 (S12). The microprocessor package 130 updates the cache directory 520 based on this notification. The cache directory 520 correspondently manages a cache address 53 (CMA53 in the figure); the logical address 51; and the hash code 52. That is, the cache directory 520 manages what area (CMA53) of the cache memory 142 data to be stored at what location (LA51) inside the logical volume 212 is stored, and the number of hash code 52 values that have been made correspondent to this data.

The write-data stored in the cache memory 142 is written at a prescribed timing to a prescribed location inside the logical volume 212. The process for transferring the data from the cache memory 142 to the logical volume 212 and storing this data in the logical volume 212 is called a destage process. The destage process can be synchronously implemented with a write command received from the host, or can be implemented asynchronously to the processing of the write command.

When the start of the destage process is indicated, the hash code-attached write-data is transferred from the cache memory 142 to the channel memory 123 inside the BEPK120 (S13). The BEPK120 transfers the data 500 inside the channel memory 123 to the disk drive 210 constituting the logical volume 212 specified as the write destination, and stores this data 500 in this disk drive 210 (S14). In so doing, the BEPK120 converts the logical address 51 to the physical address of the disk drive 210. Furthermore, the BEPK120 calculates the parity data corresponding to the RAID level set in the write-destination logical volume 212. The hash code-attached disk data 540 is stored in the write-destination logical volume 212.

Figure 6:
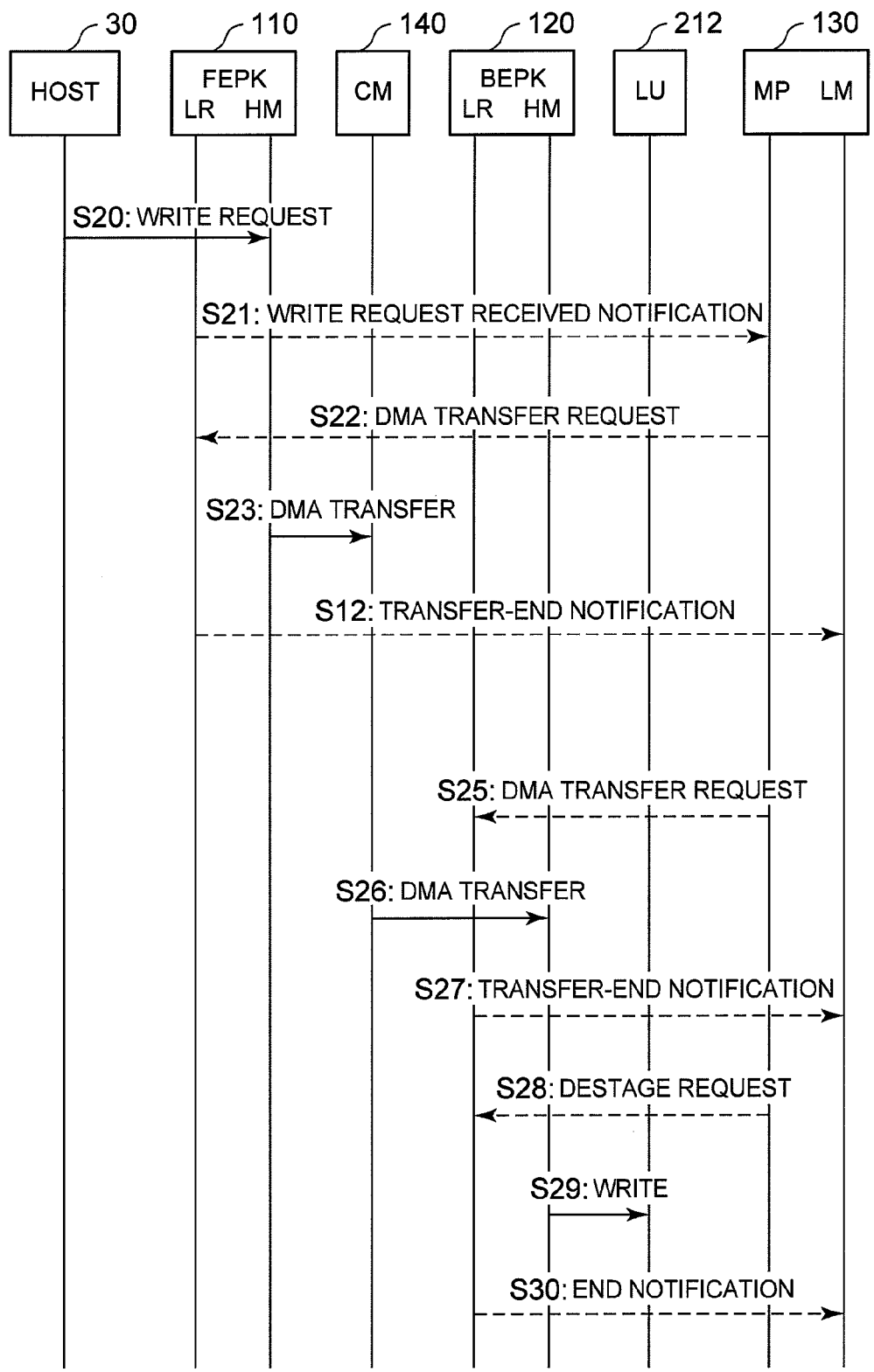
FIG. 6 is a flowchart of the process for writing the write-data from the host to the volume.

FIG. 6 is a flowchart showing details of the overview of the processing shown in FIG. 5. The step numbers will be explained once again using FIG. 6. The FEPK110 receives a write request issued from the host 30 (S20). The write request is configured from a write command and write-data.

The FEPK110 notifies the MPPK130 to the effect that a write request has been received from the host 30 (S21). The MPPK130 requests the FEPK110 to carry out a DMA transfer of the write-data (S22).

The FEPK110 performs a DMA transfer of the hash code-attached write-data (hash code-attached channel memory data 500 of FIG. 5) stored in the channel memory 113 to the cache memory package 140 in accordance with the transfer request from the MPPK130 (S23). When the DMA transfer to the cache memory package 140 ends, the FEPK110 notifies the MPPK130 to the effect that the DMA transfer has ended (S12).

The FEPK110 can report to the host 30 to the effect that write command processing has ended at the point in time that the write-data is written to the cache memory 142. Or, the FEPK110 can also report to the host 30 to the effect that write command processing has ended after checking that the write-data has been written to the disk drive 210.

The MPPK130 requests the BEPK120 to perform a DMA transfer to commence the destage process (S25). The BEPK120 carries out a DMA transfer to transfer the hash code-attached write data (the hash code-attached cache data 530 of FIG. 5) stored in the cache memory 142 to the channel memory 123 inside the BEPK120 (S26). The BEPK120 notifies the MPPK130 to the effect that the DMA transfer has ended (S27).

The MPPK130 requests that the BEPK120 execute destage processing (S28). The BEPK120 transfers and writes the hash code-attached write-data (the hash code-attached channel memory data 500 of FIG. 5) stored in the channel memory 123 to the logical volume 212 specified from the host 30 (S29). Specifically, the BEPK120 writes the hash code-attached write-data to the disk drive 210 constituting the write-destination logical volume 212. The BEPK120 reports process-end to the MPPK130 when destage processing has ended (S30). By so doing, a hash code 52 is set in the write-data received from the host 30 and stored in the logical volume 212.

Figure 7:
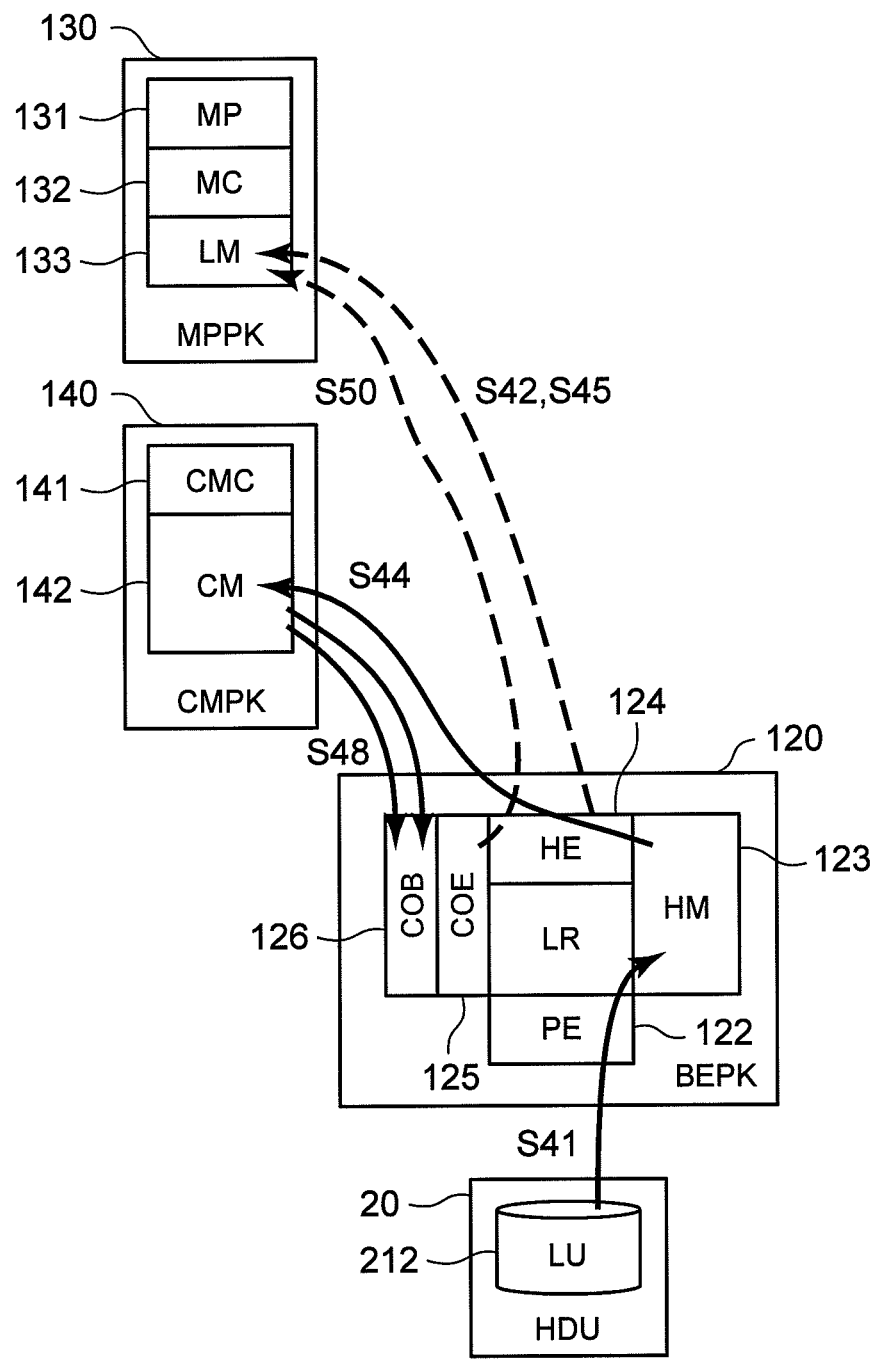
FIG. 7 is a schematic diagram showing how to compare data inside the volume.

The process for determining whether or not a plurality of data stored in the logical volume 212 is duplicated data will be explained on the basis of FIGS. 7 and 8. FIG. 7 shows an overview of processing for comparing respective data inside the logical volume 212. The contents of this processing are shown in more detail in the flowchart of FIG. 8. Common step numbers are used in FIGS. 7 and 8. Accordingly, the explanation will focus on FIG. 8.

For example, when duplicated data detection or duplicated data removal is indicated by the user, or when a preconfigured prescribed examination time arrives, the MPPK130 requests that the BEPK120 read out the comparison-targeted data (S40).

The BEPK120 reads out the comparison-targeted data from the logical volume 212, stores this data in the channel memory 123 (S41), and notifies the MPPK130 to the effect that read-out has ended (S42).

The MPPK130 requests the BEPK120 for a DMA transfer (S43). The BEPK120 carries out a DMA transfer to transfer the data inside the channel memory 123 to the cache memory 142 (S44), and notifies the MPPK130 to the effect that the DMA transfer has ended (S45).

The process for transferring the data read out from the logical volume 212 to the cache memory 142 and storing this data in the cache memory 142 is called staging. When data is staged to the cache memory 142, the hash code of this data is notified to the MPPK130, and this hash code is registered in the cache directory 520 inside the MPPK130. Accordingly, the MPPK130 compares the hash codes of the plurality of data staged as the comparison targets, and determines whether or not the two hash codes match (S46).

When the hash codes of the respective comparison-targeted data do not match, processing ends. Since respective data for which the hash codes do not match are clearly separate data, there is no need to examine this data further. By contrast, when the hash codes of the respective staged data do match, a more detailed examination is carried out.

The MPPK130 requests that the BEPK120 compare the respective staged data (S47). That is, the MPPK130 requests a comparison of the respective data rather than a comparison of the respective hash codes.

The BEPK120 respectively reads out the comparison-targeted data from the cache memory 142 (S48). Each time a prescribed amount of data is read out from the cache memory 142, the BEPK120 notifies the cache memory package 140 to the effect that this data was received (S49).

The BEPK120 uses the comparison buffer 126 and the comparison circuit 125 to compare the two pieces of data read out from the cache memory 142, and notifies the MPPK130 of the results of this comparison (S50).

The results of comparison, for example, can be carried out in byte units. When comparing two data of 512-bytes each, the results of comparison are shown for each byte. A "0" can be set when the data match, and a "1" can be set when the data do not match. For example, the results of comparing the respective logical blocks becomes 512-bits of data such as "00000010000 . . . ".

The MPPK130 executes the processing for removing the duplicated data (S51). How to process the detected duplicated data has been set in advance. The details of processing will be explained more hereinbelow.

Figure 8:
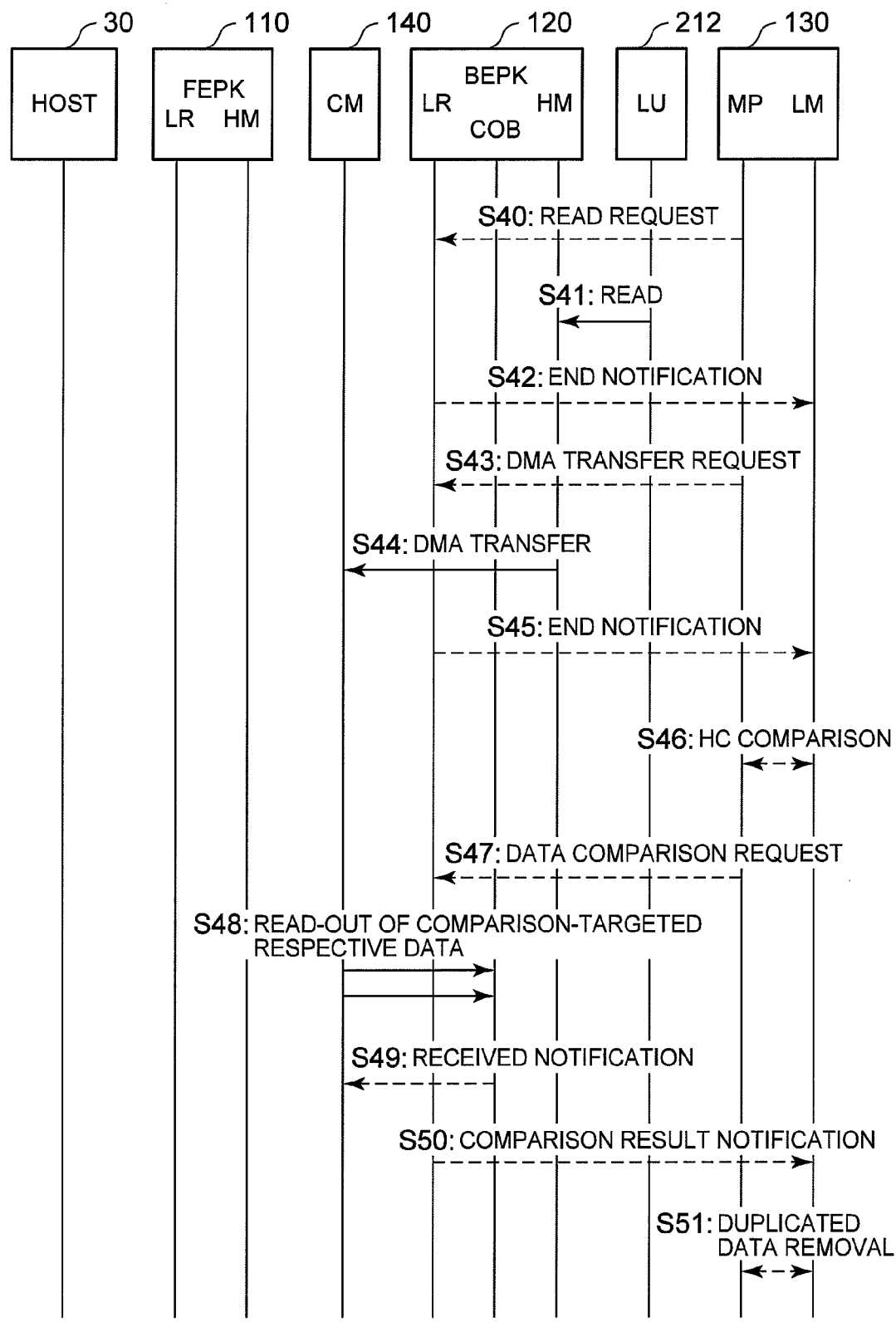
FIG. 8 is a flowchart showing the process for comparing the data inside the volume.
Figure 9:
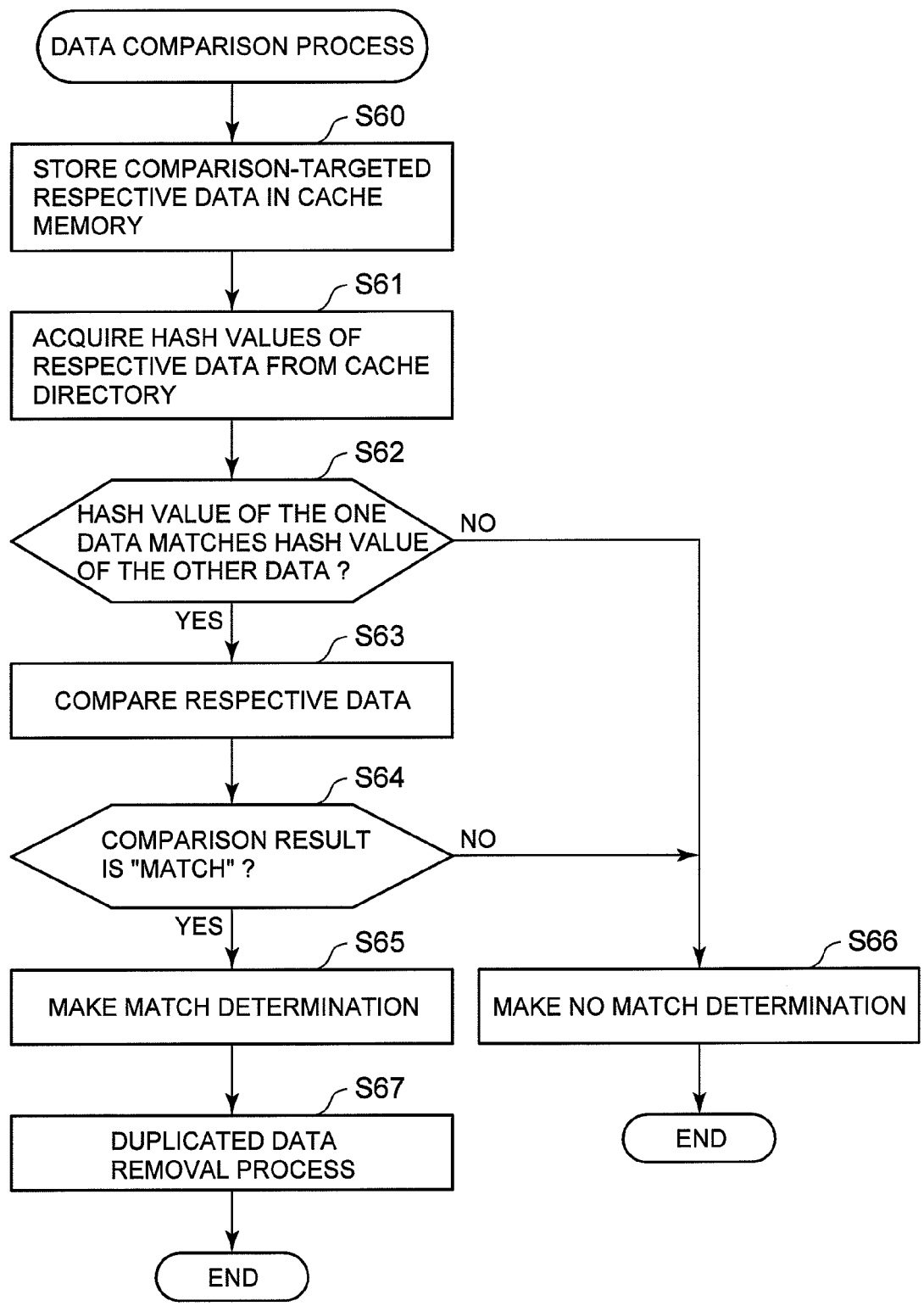
FIG. 9 is a flowchart showing the data comparison process.

FIG. 9 is a flowchart showing the data comparison processing described using FIG. 8 from a different perspective. As has already been explained, in this embodiment, a plurality of comparison-targeted data is stored in the cache memory 142 (S60), and the hash codes (hash values) of the respective data are respectively acquired from the cache directory 520 (S61).

Then, in this embodiment, a determination is made as to whether or not the one hash code matches the other hash code (S62), and when the two hash codes match (S62: YES), the respective data are compared (S63).

In this embodiment, a determination is made as to whether or not the comparison results of the respective data "match" or "do not match" (S64), and when the results of comparison match (S64: YES), it is determined that the two data stored in the cache memory 142 in S60 match (S65). That is, it is determined that the data is duplicated data (S65).

When it is determined that the data is duplicated data, in this embodiment, processing for removing the duplicated data is executed (S67). When either the hash codes set in the comparison-targeted data do not match (S62: NO), or when the results of comparison of the respective data do not match (S64: NO), a determination is made that the respective data do not match and are different data (S66).

Figure 10:
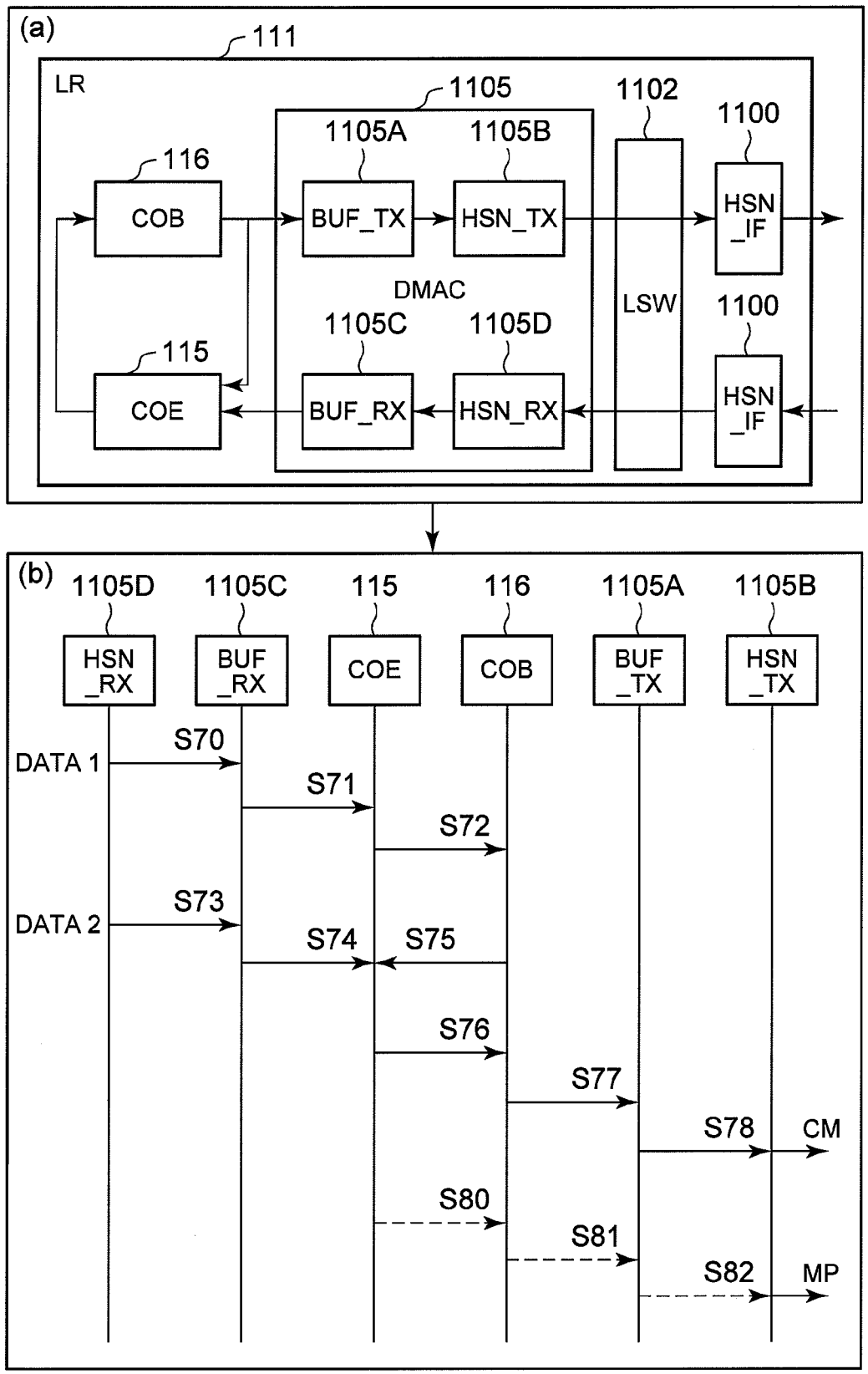
FIG. 10 is a flowchart and block diagram showing the process for comparing data.

FIG. 10 is a schematic diagram showing how the respective data are compared. FIG. 10A shows the circuit configuration for comparing the data, and FIG. 10B shows a flowchart. An explanation will be given by referring to FIGS. 10A and 10B. In FIG. 10, for convenience of explanation, data comparison will be explained by using the configuration inside the front-end package 110 as an example, but the data can also be compared the same way inside the back-end package 120 as well. When comparing the data inside the logical volume, the comparison circuit 125 inside the back-end package 120 can be used.

An internal network interface receiving circuit 1105D (HSN_RX1105D in the figure) receives a comparison-targeted first data from the cache memory 142 by way of the internal network interface 1100. The receiving circuit 1105D stores the received first data in a receiving buffer 1105C (BUF_RX1105C in the figure) (S70). The comparison circuit 115 acquires the first data from the receiving buffer 1105C (S71), and inputs and stores this first data in the comparison buffer (S72).

Similarly, a comparison-targeted second data is also inputted by way of the receiving buffer 1105C (S73) to the comparison circuit 115 (S74). The comparison circuit 115 reads in the first data from the comparison buffer 116 at the same time as the second data is read in (S75). Consequently, the comparison circuit 115 compares the first data against the second data in order from the heads of the data in prescribed amounts.

The results of comparison by the comparison circuit 115 are inputted via the comparison buffer 116 (S76) to the transmission buffer 1105A (BUF_TX1105A in the figure) (S77). The results of comparison are sent from the transmission buffer 1105A to the cache memory package 140 via an internal network interface transmission circuit 1105B (HSN_TX1105B in the figure) and an internal switch 1102 (S78).

Further, the status of the comparison results (status information as to whether or not the data match) is sent by way of the comparison buffer 116 and the transmission buffer 1105A (S80, S81) from the comparison circuit 115 to the MPPK130 (S82).

Figure 11:
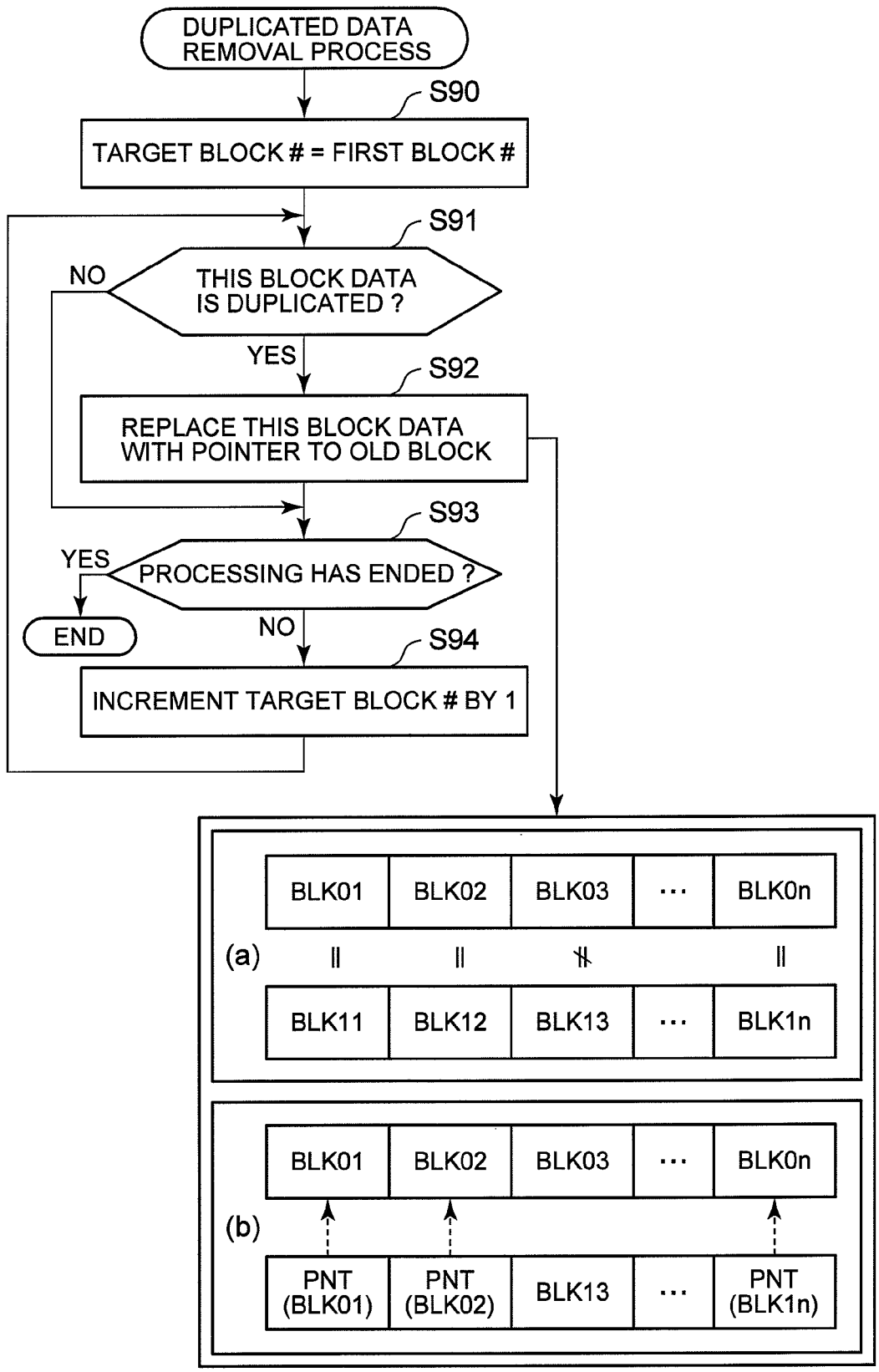
FIG. 11 is a flowchart showing the process for removing duplicated data.

FIG. 11 shows the duplicated data removal process shown in S67 of FIG. 10. This process is executed by the MPPK130. A case in which processing is performed in logical block units will be explained.

The MPPK130 sets a target block number in the first block number of the target data (S90). Then, the MPPK130 determines whether or not the data of the target block is duplicated (S91).

When the data of the target block is duplicated (S91: YES), the MPPK130 changes the contents of the target block to pointer information pointing toward another duplicated logical block (S92). When the data of the target block is not duplicated (S91: NO), the MPPK130 skips S92 and moves to S93, and determines whether or not processing has been performed for all the blocks of the target data.

When an unprocessed block remains (S93: NO), the MPPK130 increments the target block number by 1 (S94), and returns to S91. When processing has been performed for all the blocks of the target data (S93: YES), the MPPK130 ends this processing.

As shown in (a) at the bottom of FIG. 11, an explanation will be given using as an example a case in which the respective blocks of the first data (BLK01 through BLK0n) are compared against the respective blocks of the second data (BLK11 through BLK1n). In the example shown in (a), it is supposed that BLK03 and BLK13 are different, but that all the other blocks beside those are the same data. The first data is old, and the second data is new.

As shown in (b) on FIG. 11, the MPPK130 sets in the duplicated blocks of the second data (BLK11, 12, 14, ... 1n) pointer information (PNT) for accessing the corresponding blocks in the first data. For example, pointer information (PNT (BLK01)) for linking to the first block of the first data is set in the first block of the second data (BLK11). That is, the old data is treated as the reference, and pointer information for using the old data in the new block is stored. Consequently, the size of the new data can be reduced, making it possible to effectively utilize the storage area of the logical volume 212.

Figure 12:
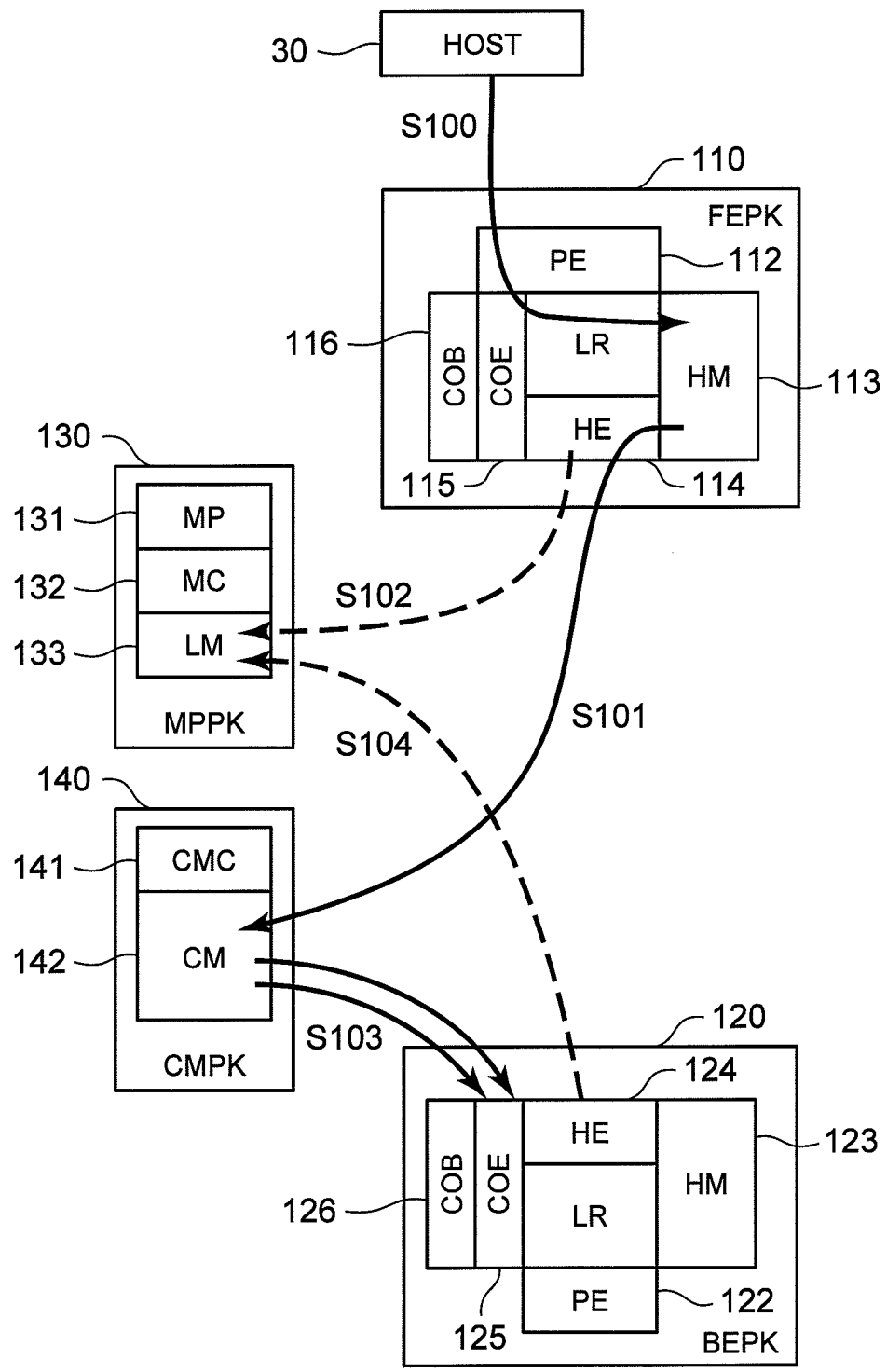
FIG. 12 is a schematic diagram showing how to compare data received from the host.
Figure 13:
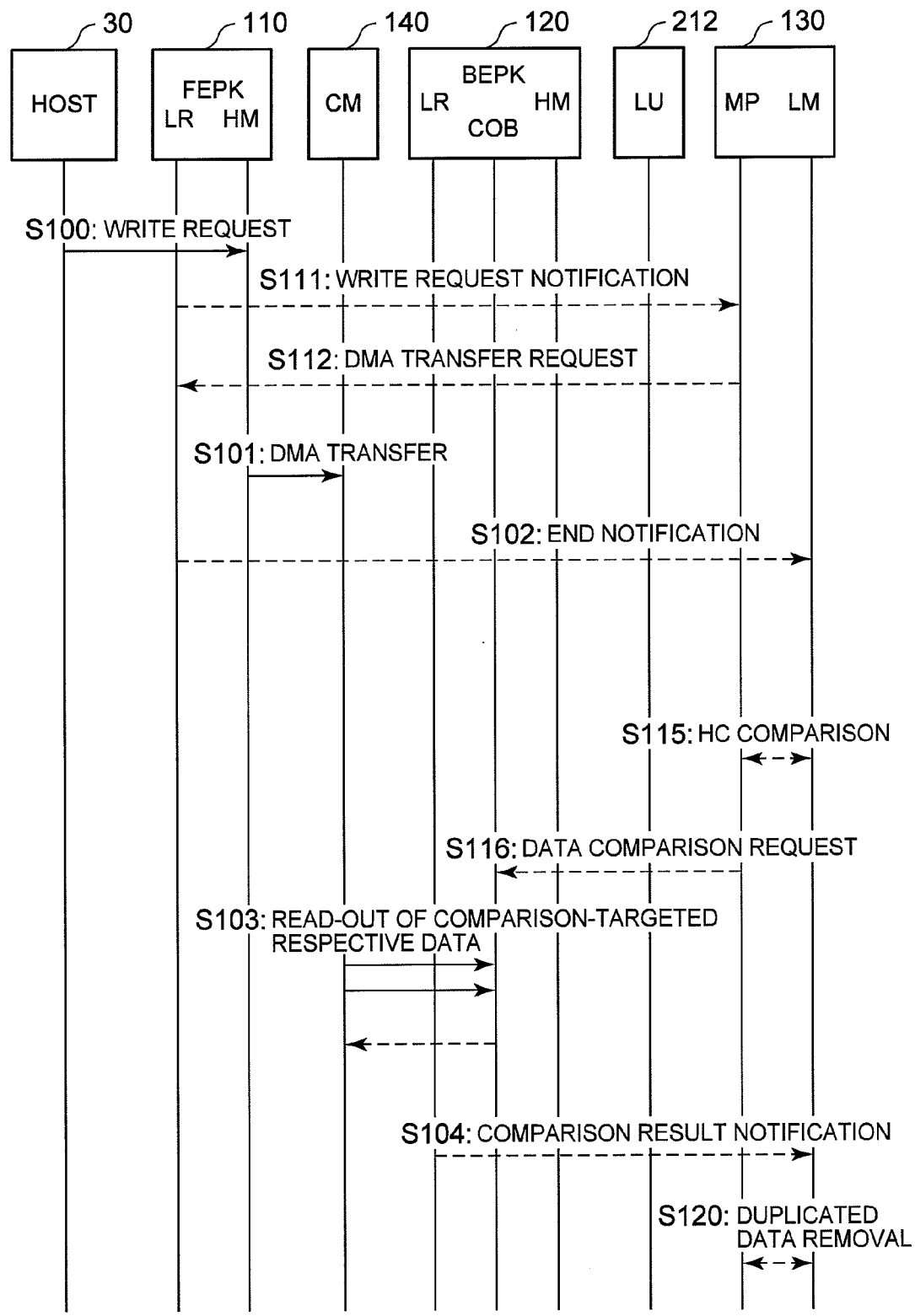
FIG. 13 is a flowchart showing the process for comparing the data received from the host.

FIG. 12 shows the comparison of respective write-data received from the host 30. FIG. 13 shows details of the overview of the processing shown in FIG. 12. This processing will be explained by changing the step numbers in FIGS. 12 and 13.

As shown in the simplified view of FIG. 12, write-data issued from the host 30 is stored in the channel memory 113 inside the FEPK110 (S100). The hash code creation circuit 114 creates hash codes for each block of the write-data, and makes these hash codes correspondent to the respective blocks.

The hash code-attached write-data is transferred to the CMPK140 and stored in the cache memory 142 (S101). The hash codes created by the hash code creation circuit 114 are transferred to the MPPK130 and registered in the cache directory 520 (S102).

When a data comparison is carried out, first the hash codes of the respective comparison-targeted data are compared. Only data with hash codes that match become the targets for data comparison. Two data targeted for comparison are sent from the cache memory 142 to the comparison circuit 125 inside the BEPK120 and compared (S103). The comparison circuit 115 inside the FEPK110 can also be used.

The comparison result is sent to the MPPK130. The MPPK130 implements the prescribed processing for duplicated data as described using FIG. 11.

FIG. 13 shows the details of the processing of FIG. 12. For convenience sake, the step numbers will be explained once again. The FEPK110, upon receiving a write request from the host 30 (S100), notifies the MPPK130 to the effect that a write request has been received (S111).

The MPPK130 requests the FEPK110 for a DMA transfer (S112). The FEPK110 carries out a DMA transfer to transfer the write-data stored in the channel memory 113 to the cache memory 142 (S101), and notifies the MPPK130 to the effect that the DMA transfer has ended (S102). The explanation will be omitted, but write-data related to another write request is also transferred to the cache memory 142 in the same manner as described in S110 through S113 above.

The MPPK130 compares the hash codes of the respective write-data transferred to the cache memory 142 (S115). When the hash codes of the respective write-data match, the MPPK130 requests the BEPK120 for a data comparison (S116). The BEPK120 respectively reads out the comparison-targeted data from the cache memory 142 (S103), and uses the comparison circuit 125 to compare these data. The BEPK120 notifies the MPPK130 of the comparison result (S104). The MPPK130 executes the process for removing the duplicated data (S120).

By configuring this embodiment like this, subsequent to narrowing down the comparison-targeted data based on the hash codes, the respective data are actually compared, and duplicated data is removed in accordance with the comparison result thereof. Therefore, even when carrying out duplicated data detection and removal, the processing load of the MPPK130 can be lessened, making it possible to suppress the deterioration of the response performance of the controller 10.

In this embodiment, a comparison circuit is used to compare the respective data. Therefore, processing can be made faster than when comparison is done by the microprocessor 131 inside the MPPK130, and the processing load of the MPPK130 can be reduced even more.

In this embodiment, the configuration for comparing data can be enlarged in accordance with enlarging the communication ports due to the configuration in which comparison circuits are provided in the FEPK110 and/or the BEPK120, resulting in outstanding scalability.

Incidentally, in this embodiment, examples of the comparison of a plurality of data stored inside the logical volume 212, and the comparison of a plurality of data received from the host 30 were explained, but this embodiment is not limited thereto, and can also be used to compare data received from the host 30 against data inside the logical volume 212. Further, the comparison circuit 115 inside the FEPK110 can be used to compare data instead of the comparison circuit 125 inside the BEPK120.

Embodiment 2

Figure 15:
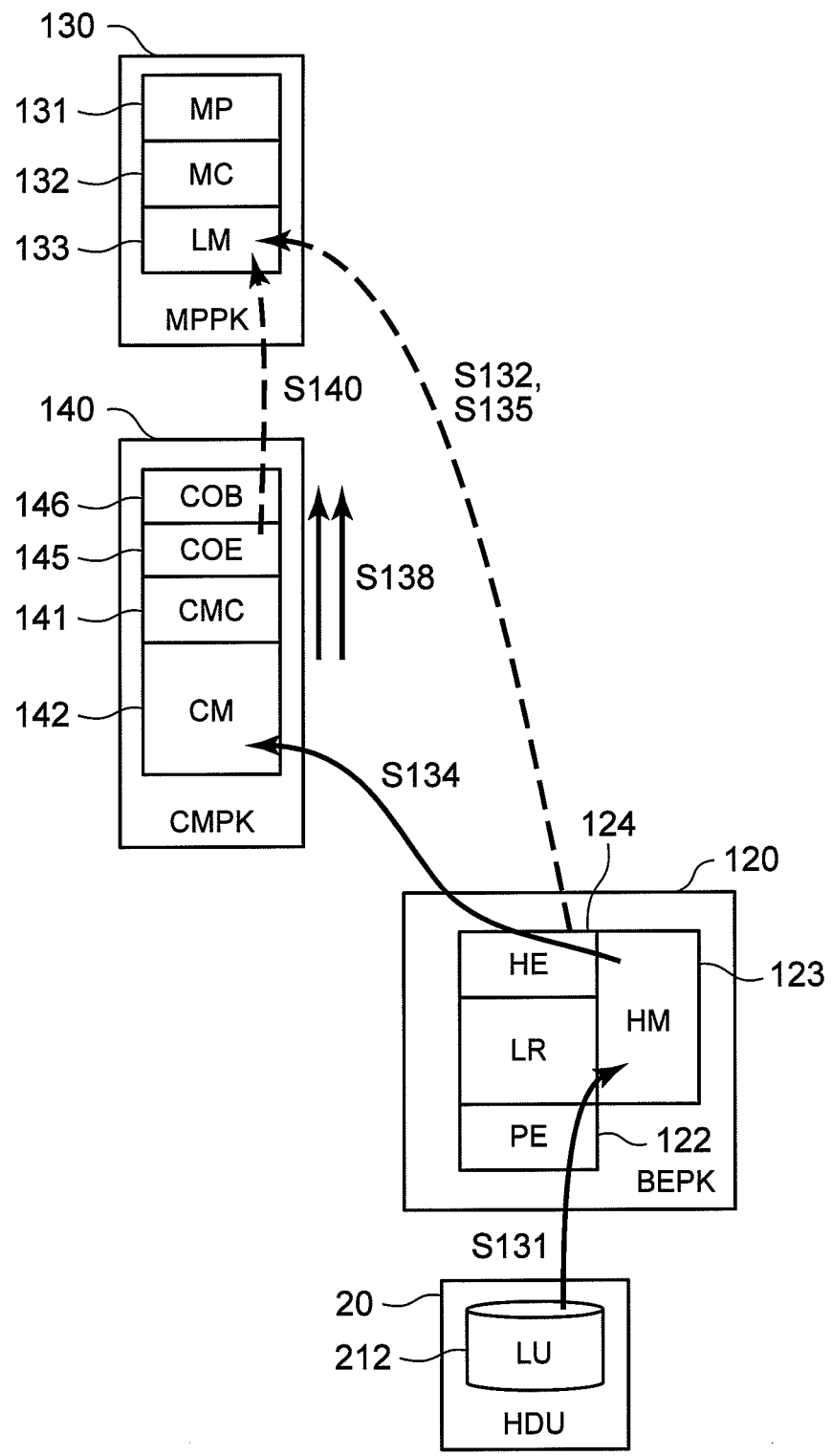
FIG. 15 is a schematic diagram showing how to compare data inside a cache memory package.
Figure 16:
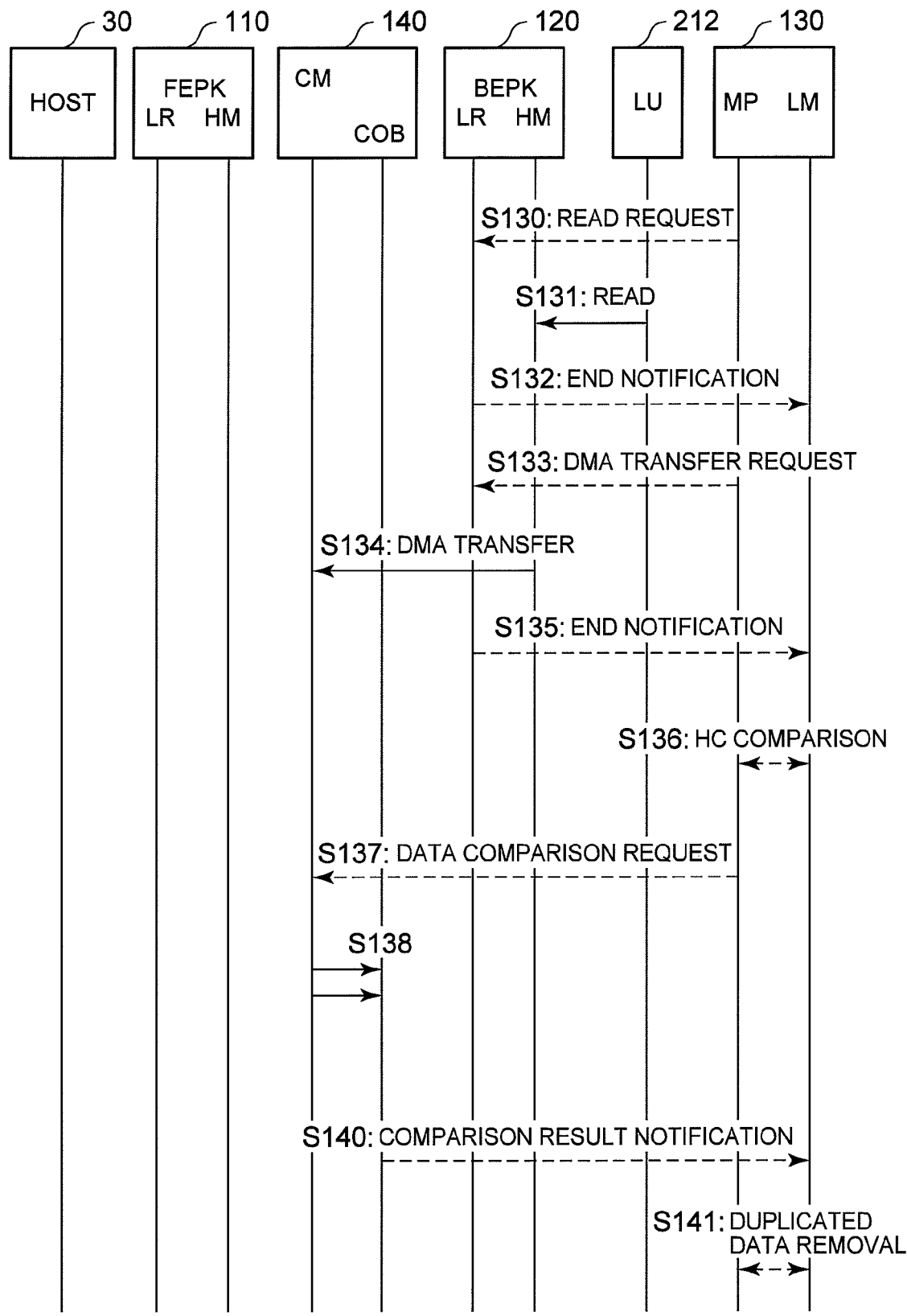
FIG. 16 is a flowchart showing a data comparison process.

A second embodiment of the present invention will be explained on the basis of FIGS. 14 through 16. The respective embodiments explained hereinbelow correspond to variations of the first embodiment. Therefore, for the respective embodiments hereinbelow, the points that differ from the first embodiment will mainly be explained. In this embodiment, a comparison circuit 145 and a comparison buffer 146 are provided inside the cache memory package 140.

Figure 14:
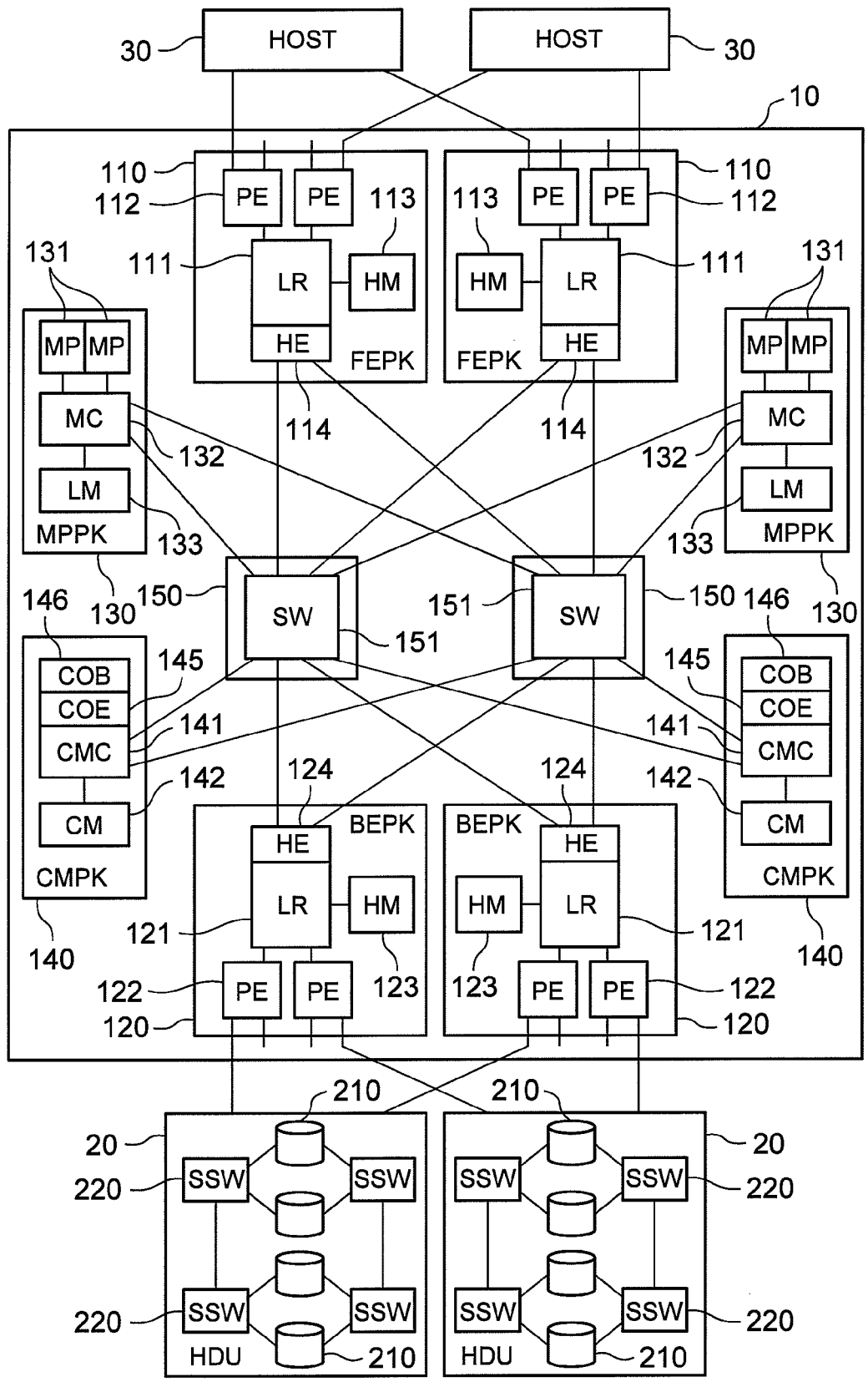
FIG. 14 is a block diagram of a controller related to a second embodiment.

FIG. 14 is a block diagram of a controller 10 according to this embodiment. In this embodiment, the comparison circuits and comparison buffers are respectively removed from the FEPK110 and BEPK120. Instead, the cache memory package 140 of this embodiment comprises a comparison circuit 145 and a comparison buffer 146.

A data comparison process according to this embodiment will be explained by referring to FIGS. 15 and 16. Common step numbers are used in FIGS. 15 and 16. Accordingly, the explanation will focus on the flowchart of FIG. 16.

In accordance with a comparison indication from the user, the MPPK130 requests the BEPK120 for a read-out of the comparison-targeted data (S130). The BEPK120 reads out the comparison-targeted data from the logical volume 212, stores this data in the channel memory 123 (S131), and notifies the MPPK130 that the read-out has ended (S132).

The MPPK130 requests the BEPK120 for a DMA transfer (S133). In accordance with this request, the BEPK120 carries out a DMA transfer to transfer the data stored in the channel memory 123 to the cache memory 142 (S134). The BEPK120 notifies the MPPK130 to the effect that the DMA transfer has ended (S135).

The MPPK130 determines whether or not the respective hash codes are a match for the two comparison-targeted data (S136). When the respective hash codes match, the MPPK130 requests the cache memory package 140 for a data comparison (S137).

The cache memory package 140 sends the two data stored in the cache memory 142 to the comparison circuit 145, and compares the two data (S138). The cache memory package 140 notifies the MPPK130 of the comparison result (S140). The MPPK130 removes the duplicated data (S141).

Configuring this embodiment like this also exhibits the same effects as the first embodiment. In addition, in this embodiment, since the configuration (145, 146) for comparing the data is provided inside the cache memory package 140, there is no need to transfer the data from the cache memory 142 to the comparison circuit 115 of the FEPK110 or the comparison circuit 125 of the BEPK120 as in the first embodiment. Therefore, a data comparison can be carried out at high speed.

Embodiment 3

A third embodiment will be explained on the basis of FIGS. 17 and 18. In this embodiment, a comparison circuit 135 and a comparison buffer 136 are provided inside the MPPK130.

Figure 17:
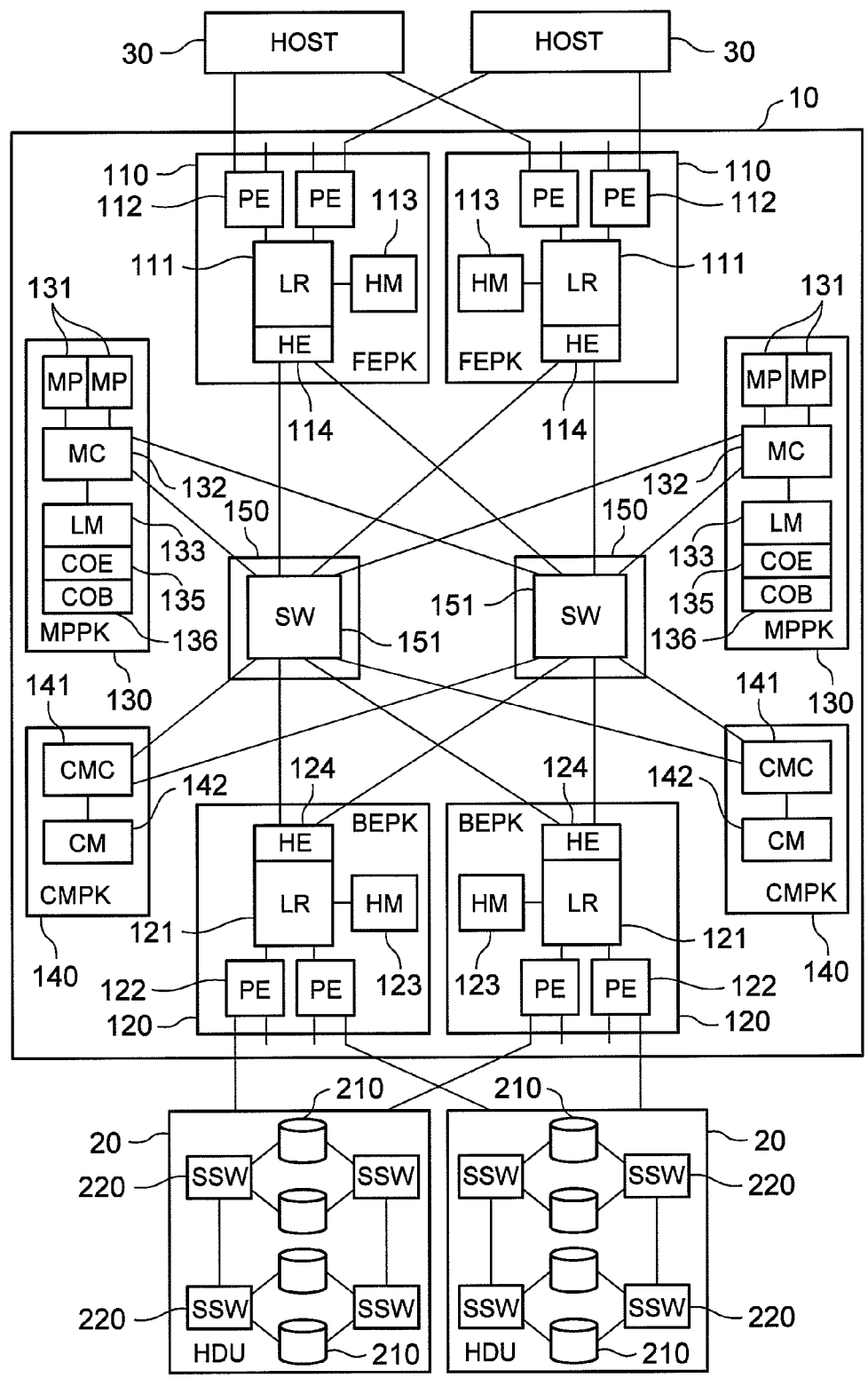
FIG. 17 is a block diagram of a controller related to a third embodiment.
Figure 18:
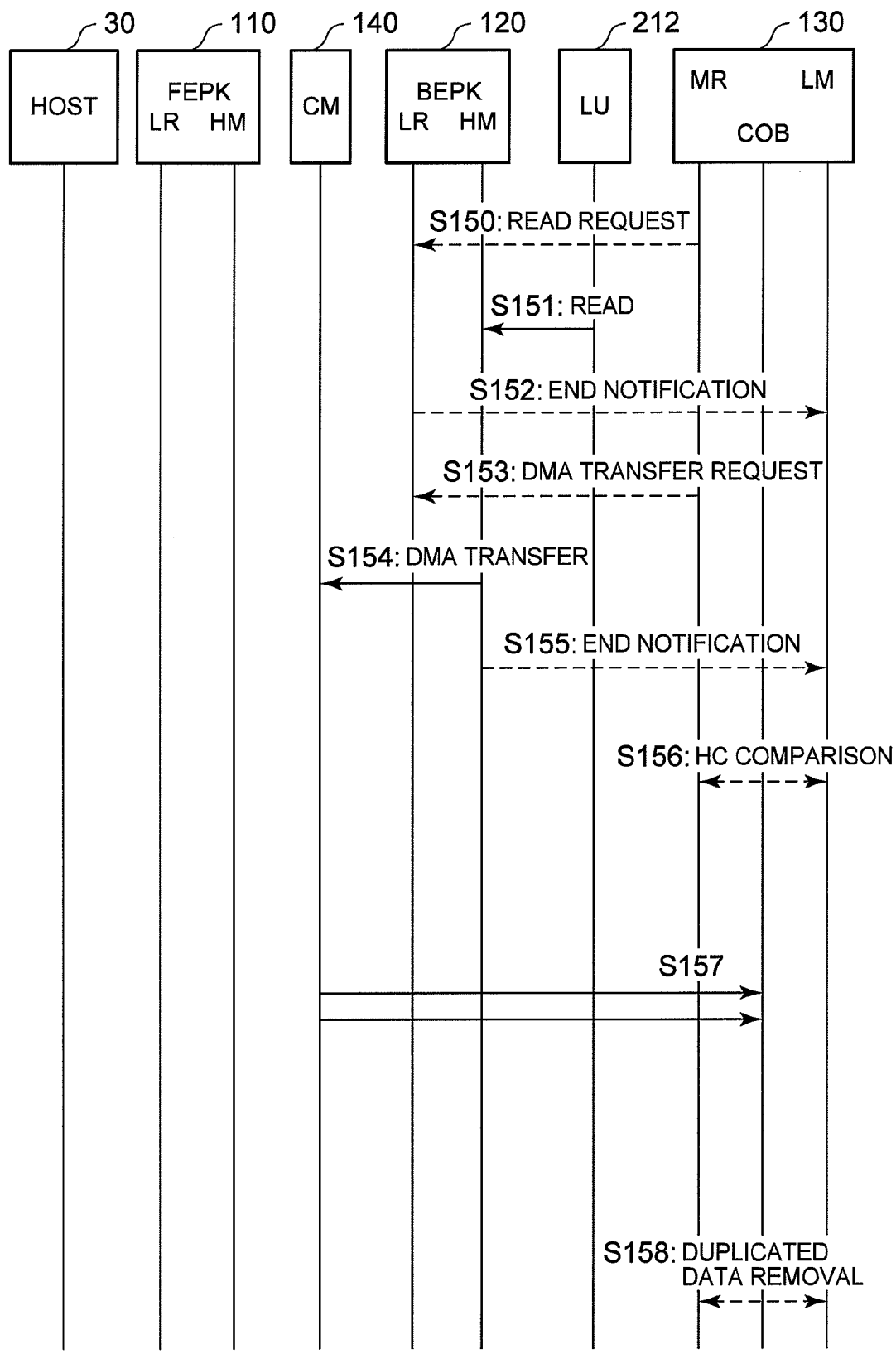
FIG. 18 is a flowchart showing a data comparison process.

FIG. 17 is a block diagram of a controller 10 according to this embodiment. In this embodiment, a comparison circuit 135 and a comparison buffer 136 are provided inside the MPPK130. FIG. 18 shows the data comparison process according to this embodiment.

Firstly, the MPPK130 requests the BEPK120 for a read-out of the comparison-targeted data (S150). In accordance with this request, the BEPK120 reads out the data from the logical volume 212, and stores this data in the channel memory 123 (S151). The BEPK120 notifies the MPPK130 to the effect that the read-out has ended (S152).

The MPPK130 requests the BEPK120 for a DMA transfer of the comparison-targeted data to the cache memory 142 (S153). The BEPK120 carries out a DMA transfer to transfer the data stored in the channel memory 123 to the cache memory 142 (S154), and notifies the MPPK130 to the effect that the DMA transfer has ended (S155).

The MPPK130 compares the hash codes respectively set for the two data transferred to the cache memory 142 (S156). When the respective hash codes match, the MPPK130 reads in the two comparison-targeted data from the cache memory 142 (S157), and uses the comparison circuit 135 to compare these data. The MPPK130 removes the duplicated data in accordance with the comparison result (S158).

Configuring this embodiment like this also exhibits the same effects as the first embodiment. In addition, since the hardware circuitry (135, 136) for comparing the data is provided inside the MPPK130 in this embodiment, the data can be compared using the dedicated hardware circuitry inside the MPPK130, making it possible to simplify the control program of the microprocessor 131.

Embodiment 4

A fourth embodiment will be explained on the basis of FIGS. 19 and 20. In this embodiment, a method for removing duplicated data and creating a difference backup will be explained.

Figure 19:
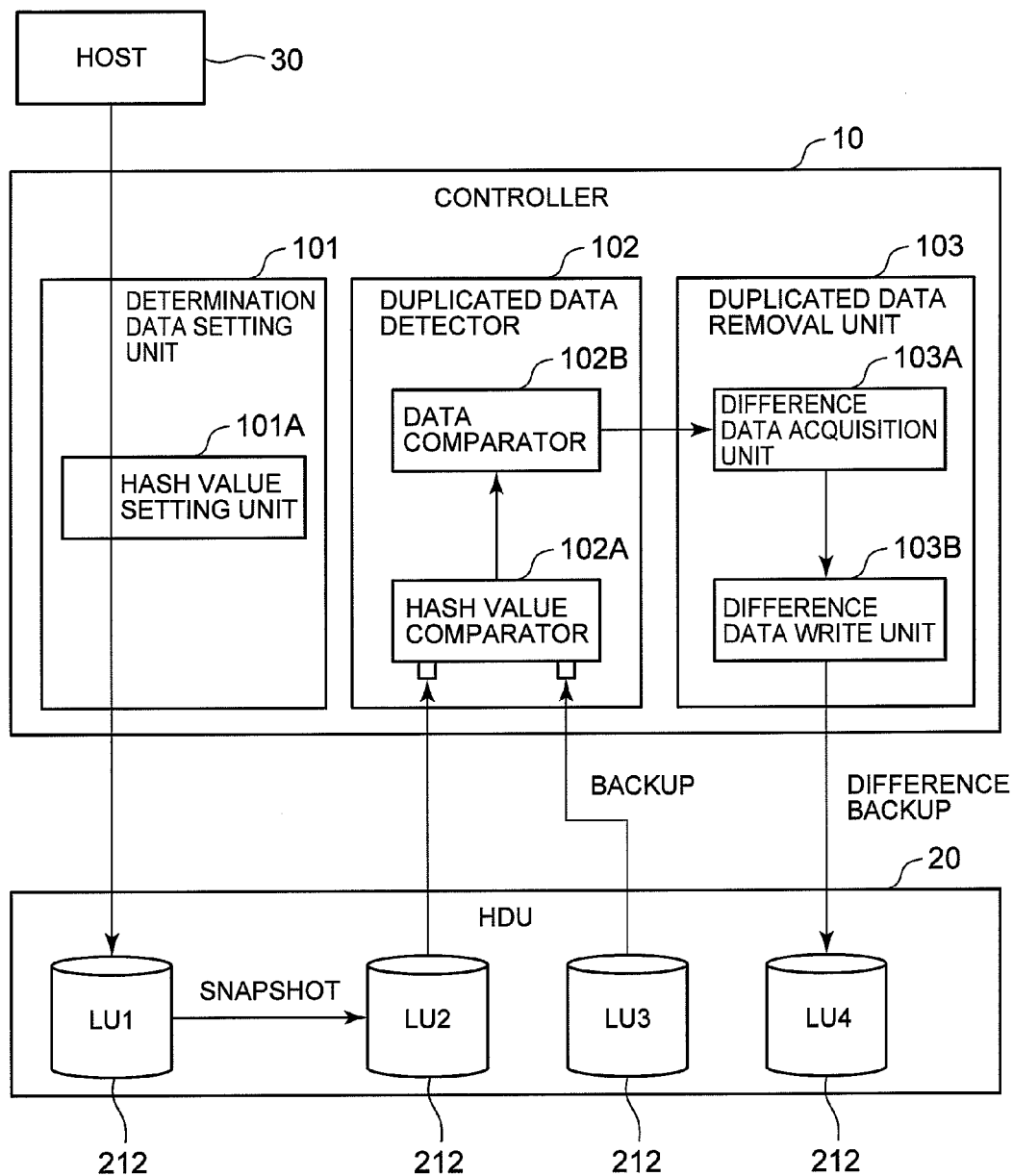
FIG. 19 is a block diagram of a system related to a fourth embodiment.

FIG. 19 shows the configuration of an information processing system according to this embodiment. The controller 10 of this embodiment, for example, comprises a determination data setting unit 101; a duplicated data detection unit 102; and a duplicated data removal unit 103.

The determination data setting unit 101 comprises a hash value setting unit 101A. The hash value setting unit 101A, for example, corresponds to the hash code creation circuit explained in the first embodiment. The duplicated data detection unit 102, for example, comprises a hash value comparator 102A for comparing hash values (will also be called hash codes hereinafter), and a data comparator 102B for comparing data. The hash value comparator 102A corresponds to one MPPK130-provided function in the first embodiment. The data comparator 102B corresponds to the comparison circuit and comparison buffer of the first embodiment.

The duplicated data removal unit 103, for example, comprises a difference data acquisition unit 103A; and a difference data write unit 103B. The difference data acquisition unit 103A acquires data that is not duplicated (difference data). The difference data write unit 103B writes the acquired difference data to a difference backup volume. The duplicated data removal unit 103 is one of the MPPK130-provided functions of the first embodiment.

Look at the HDU20. This embodiment comprises a main volume (LU1); a snapshot volume (LU2); a latest full backup volume (LU3); and a difference backup volume (LU4). The snapshot volume (LU2) stores a snapshot image of a certain point in time.

Figure 20:
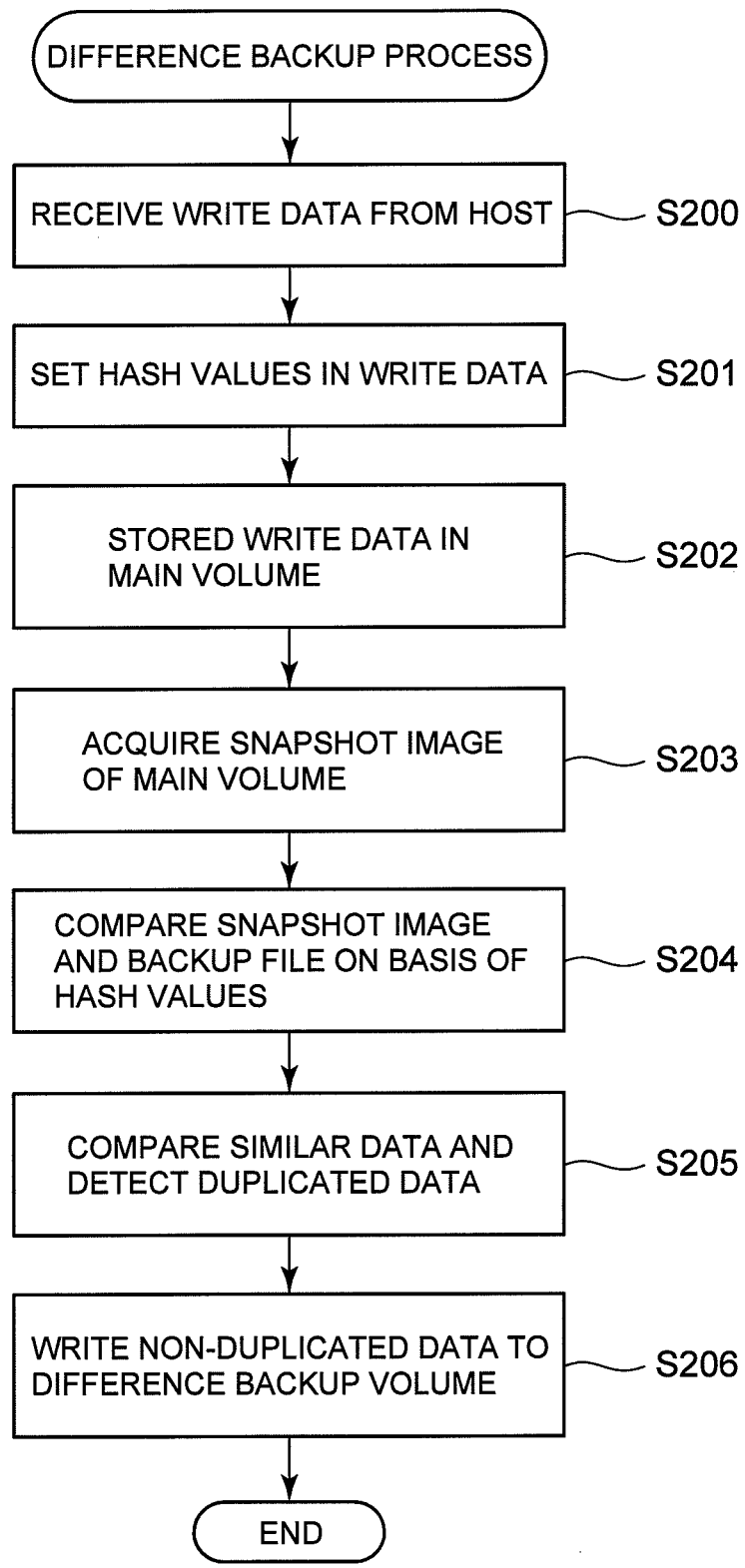
FIG. 20 is a flowchart of a difference backup process.

FIG. 20 is a flowchart showing a difference backup process. The controller 10, upon receiving write-data from the host 30 (S200), sets a hash code in the write-data (S201). The controller 10 stores the hash code-attached write-data in the main volume (LU1) (S202).

The controller 10 acquires a snapshot image of the main volume (LU1) based on an indication from the user or on a preconfigured schedule (S203). The controller 10 compares the snapshot image (LU2) against the full backup volume (LU3) on the basis of the hash codes (S204).

The controller 10 compares the file data for which the hash codes match, and detects the duplicated data (S205). The controller 10 detects non-duplicated data on the basis of the duplicated data, and writes only the data that is not duplicated to the difference backup volume (LU4) (S206).

Configuring this embodiment like this also exhibits the same effects as the first embodiment. In addition, in this embodiment, only the data that is not duplicated can be extracted and stored in the difference backup volume (LU4) by detecting the duplicated data. Therefore, difference backup processing can be carried out more rapidly.

Embodiment 5

A fifth embodiment will be explained on the basis of FIGS. 21 and 22. In this embodiment, write-data received from the host 30 is compared against data inside the full backup volume (LU3), and only the data that is not duplicated (difference data) is stored in the difference backup volume (LU4).

Figure 21:
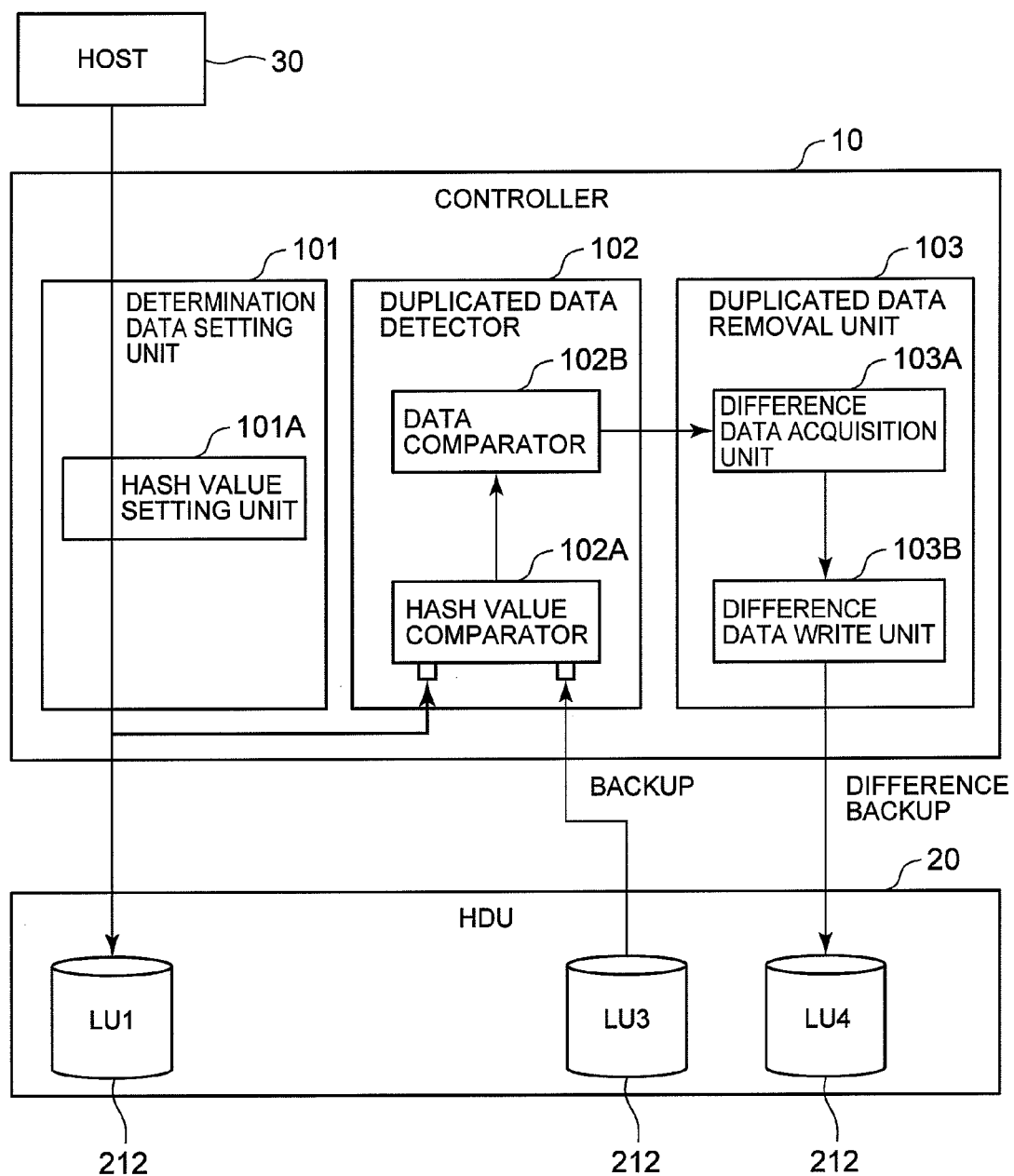
FIG. 21 is a block diagram of a system related to a fifth embodiment.

FIG. 21 shows the overall configuration of an information processing system according to this embodiment. A hash code of data received from the host 30 and a hash code of data stored in the full backup volume (LU3) are inputted to a hash value comparator 102A.

Figure 22:
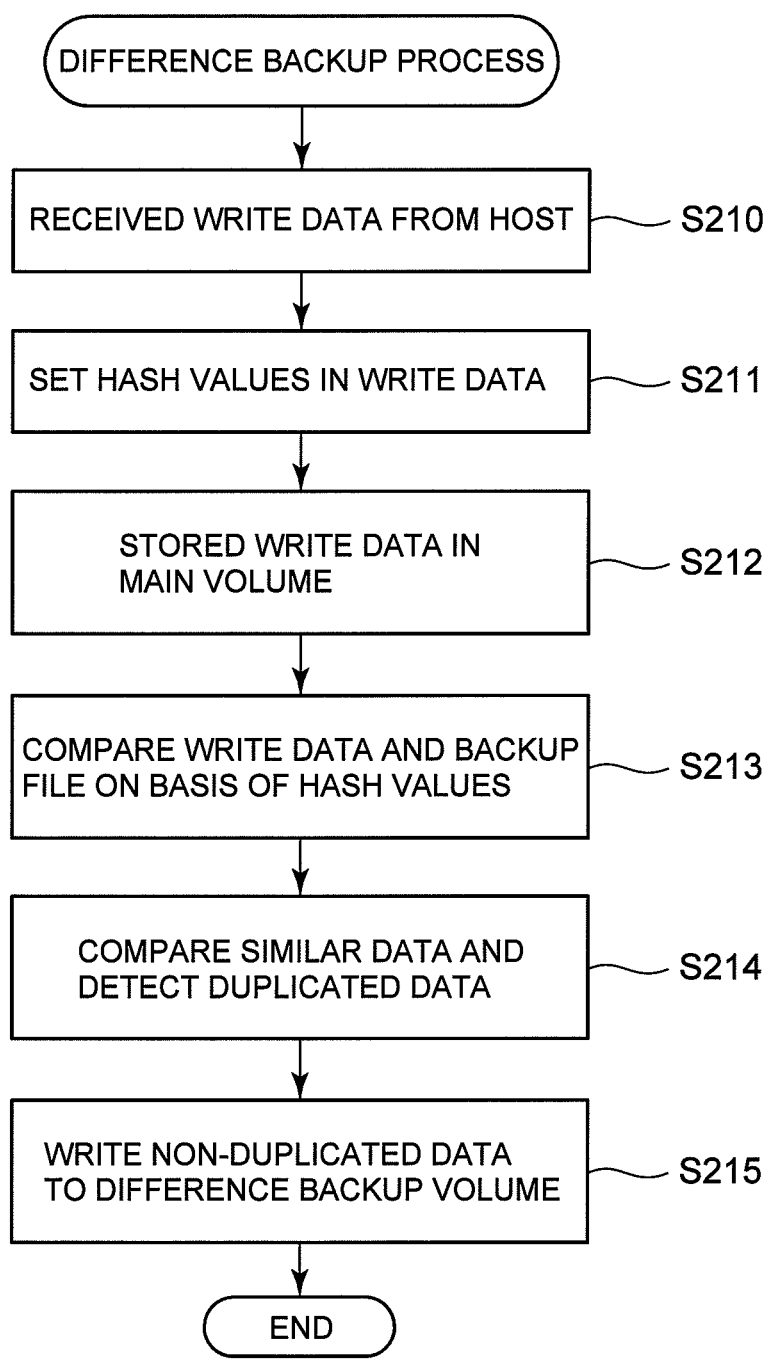
FIG. 22 is a flowchart of a difference backup process.

FIG. 22 is a flowchart showing a difference backup process according to this embodiment. The controller 10, upon receiving write-data from the host 30 (S210), sets hash codes in each block of the write-data (S211). The controller 10 stores the write-data in the main volume (LU1) (S212).

The controller 10 compares the hash codes set in the write-data against the hash codes set in the data inside the full backup volume (LU3) (S213), and, in addition, compares the respective data for which the hash codes match (S214). Consequently, duplicated data is detected. The controller 10 detects the data that is not duplicated on the basis of the duplicated data, and writes only the non-duplicated data to the difference backup volume (LU4) (S215).

Configuring this embodiment like this also exhibits the same effects as the first embodiment. In addition, in this embodiment, of the data received from the host, only the data that differs from the full-backup data can be written to the difference backup volume in real-time, making it possible to speed up difference backup processing.

Embodiment 6

A sixth embodiment will be explained on the basis of FIGS. 23 and 24. In this embodiment, a case that uses a remote copy process will be explained.

Figure 23:
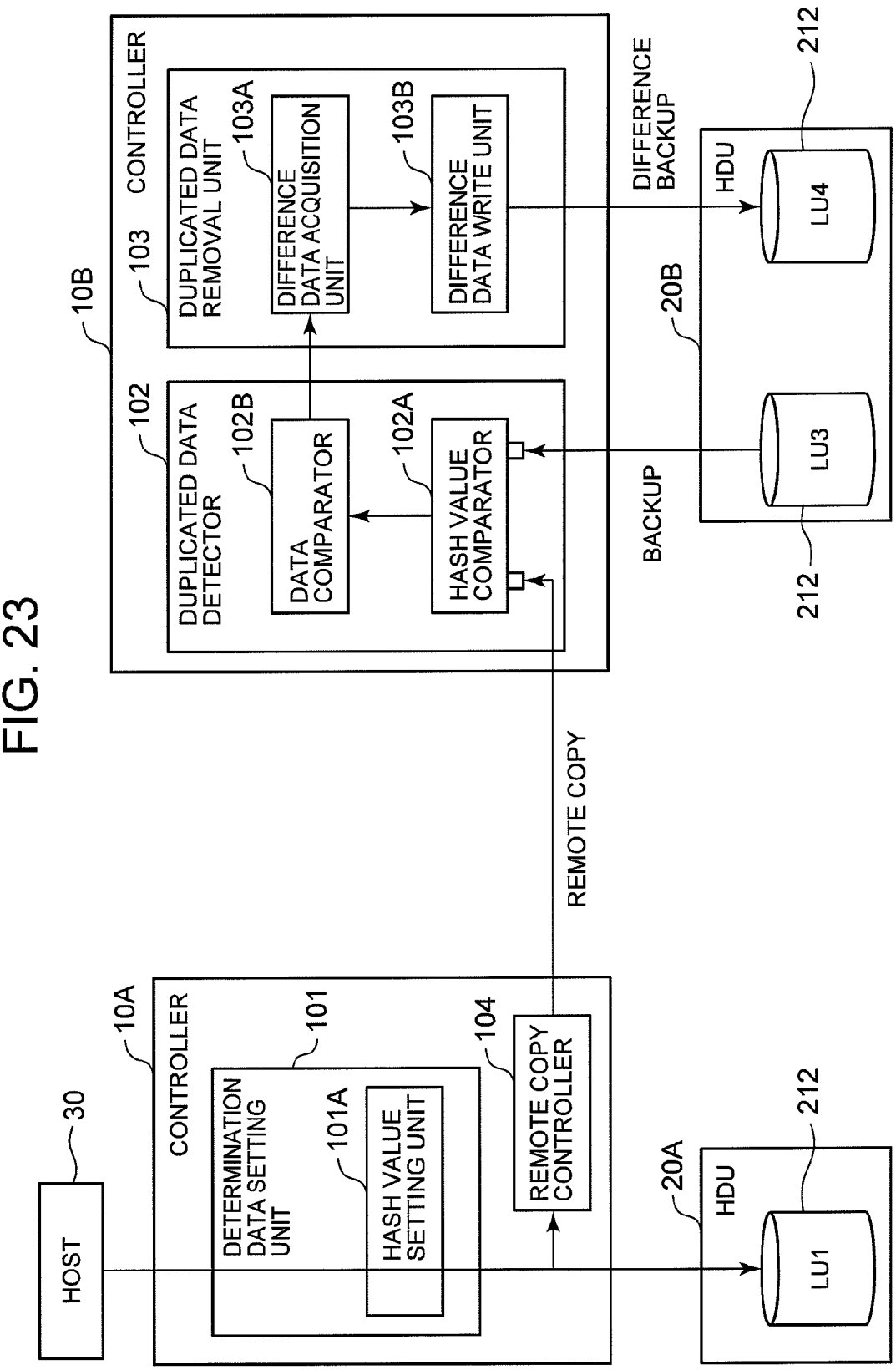
FIG. 23 is a block diagram of a system related to a sixth embodiment.

FIG. 23 shows the overall configuration of an information processing system according to this embodiment. A controller 10A provided in the primary site comprises a determination data setting unit 101; and a remote copy controller 104. A controller 10B is provided in a remote site, which is located in a place away from the primary site. The controller 10B comprises a duplicated data detector 102; and a duplicated data removal unit 103.

Figure 24:
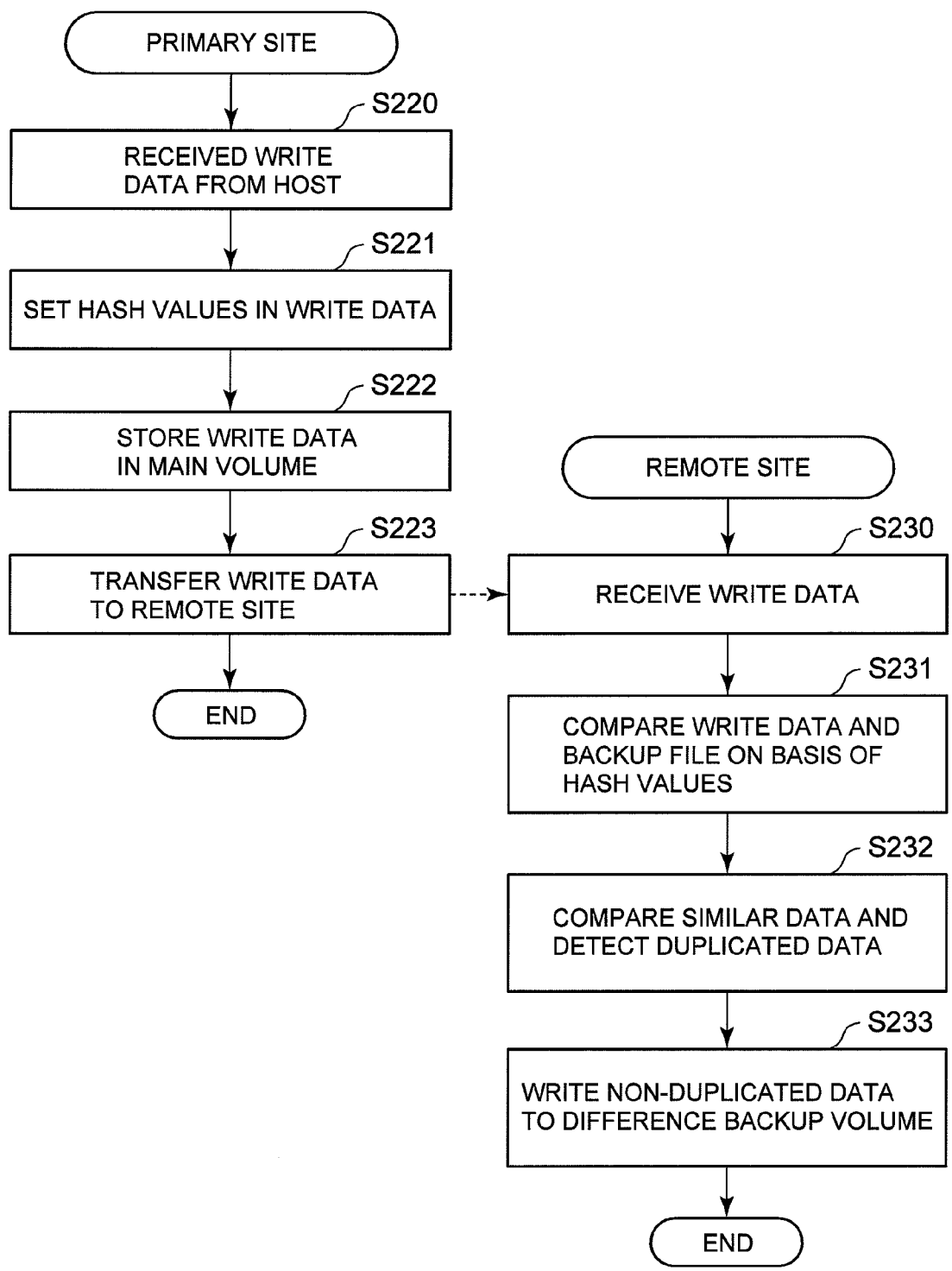
FIG. 24 is a flowchart of a remote copy process.

FIG. 24 is a flowchart of a remote copy process. The primary site controller 10A, upon receiving write-data from the host 30 (S220), sets hash codes in each block of the write-data (S221). Controller 10A writes the hash code-attached write-data to the main volume (LU1) inside the primary site (S222). Furthermore, the controller 10A transfers the write-data to the remote site controller 10B (S223).

The remote site controller 10B, upon receiving the hash code-attached write-data (S230), compares the hash codes set in the write-data against the hash codes set in the data stored in the full backup volume (LU3) (S231).

Controller 10B compares the data for which the hash codes match, and detects duplicated data (S232). Controller 10B specifies data that is not duplicated on the basis of the duplicated data, and writes only the non-duplicated data to the difference backup volume (LU4) (S233).

Configuring this embodiment like this also exhibits the same effects as the first embodiment. In addition, since only non-duplicated data is stored in the difference backup volume in this embodiment, a remote copy process can be carried out at high speed.

Embodiment 7

A seventh embodiment will be explained on the basis of FIG. 25. This embodiment shows an example of a method for setting a target and time for detecting duplicated data.

Figure 25:
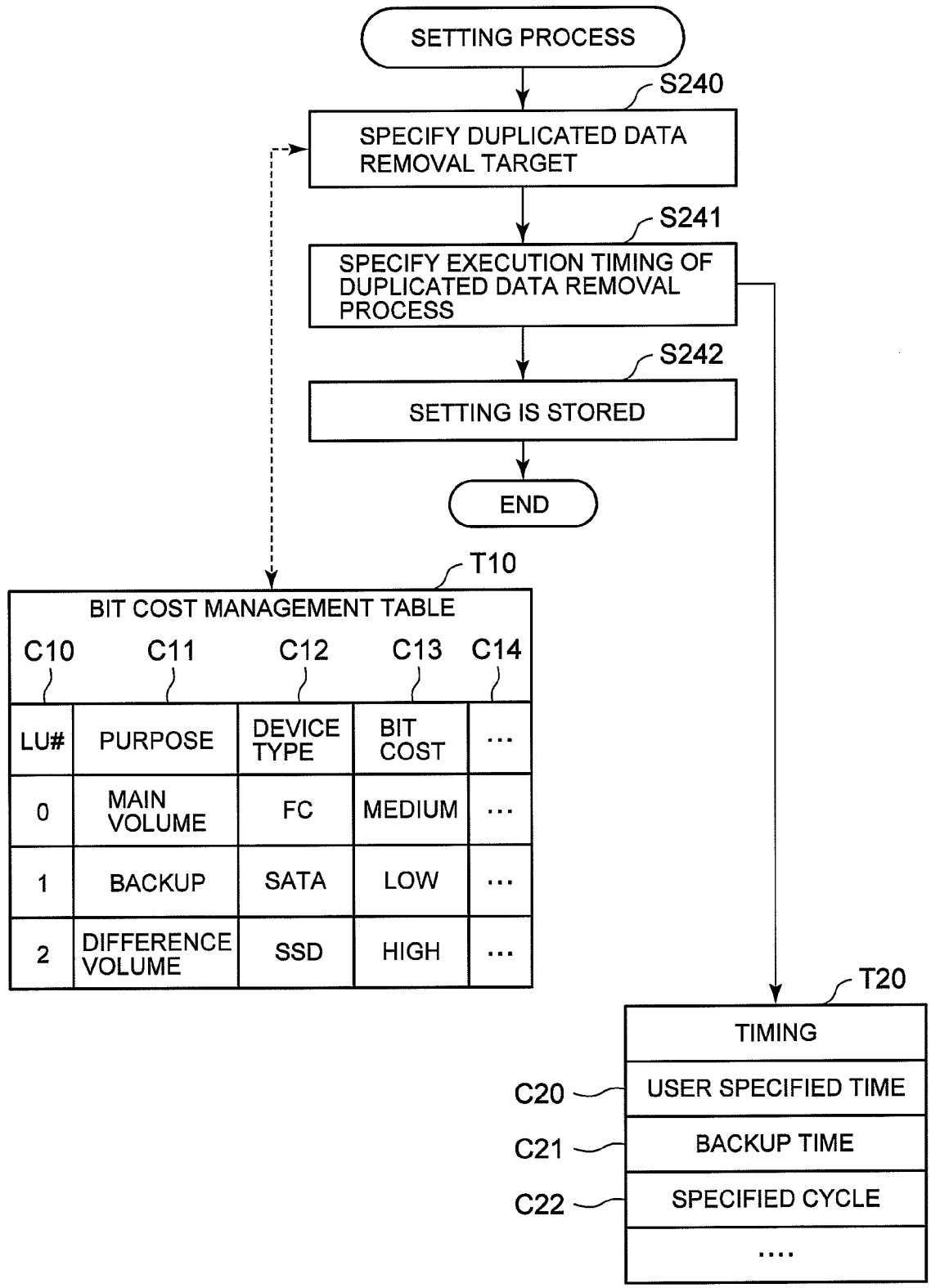
FIG. 25 is a flowchart for carrying out a setting related to a data comparison process, which is executed by a controller related to a seventh embodiment.

FIG. 25 shows a process for carrying out a setting related to a data comparison process. The user, for example, specifies via a management terminal connected to the controller 10 a target for carrying out the removal of duplicated data (S240). The user, for example, can use a bit cost management table T10 to specify a duplicated data removal target.

The bit cost management table T10, for example, correspondently manages a logical volume number (LU#) C10, a purpose C11, a device type C12, a bit cost C13, and other C14.

The logical volume number C10 is information for specifying the respective logical volumes 212. The purpose C11 is information that shows the purpose of the relevant logical volume. The purpose, for example, can include use as the main volume, use as the full backup volume, and use as the difference backup volume.

The device type C12 is information showing the kind of storage device constituting the relevant logical volume. The device type, for example, can include a FC disk, SATA disk, flash memory device (SSD) and so forth. The bit cost C13 is information showing the bit cost of the relevant logical volume. The bit cost does not have to be an accurate amount, but rather can be a relative value revealing the magnitude of costs. The other C14, for example, can include the volume size, RAID level and so forth.

The user, for example, can specify as the duplicated data removal target a logical volume that has a relatively high bit cost by referring to the bit cost management table T10 (S240).

Next, the user specifies a timing for carrying out a duplicated data removal process (data comparison process) (S241). The user uses a timing management table T20 to select the execution timing. As shown in the timing management table T20, execution timing can include a user-specified date/time C20, a backup execution time C21, a specified cycle C22 and so forth.

Configuring this embodiment like this also exhibits the same effects as the first embodiment. In addition, in this embodiment, it is possible to decide a target for carrying out duplicated data detection and removal in volume units taking into account bit costs and the like, and it is also possible to specify the timing for carrying out duplicated data removal for each logical volume. Therefore, for example, diligently removing duplicated data from a high bit cost logical volume makes it possible to efficiently use the storage areas of the high bit cost logical volume, thereby enhancing user usability.

Embodiment 8

Figure 26:
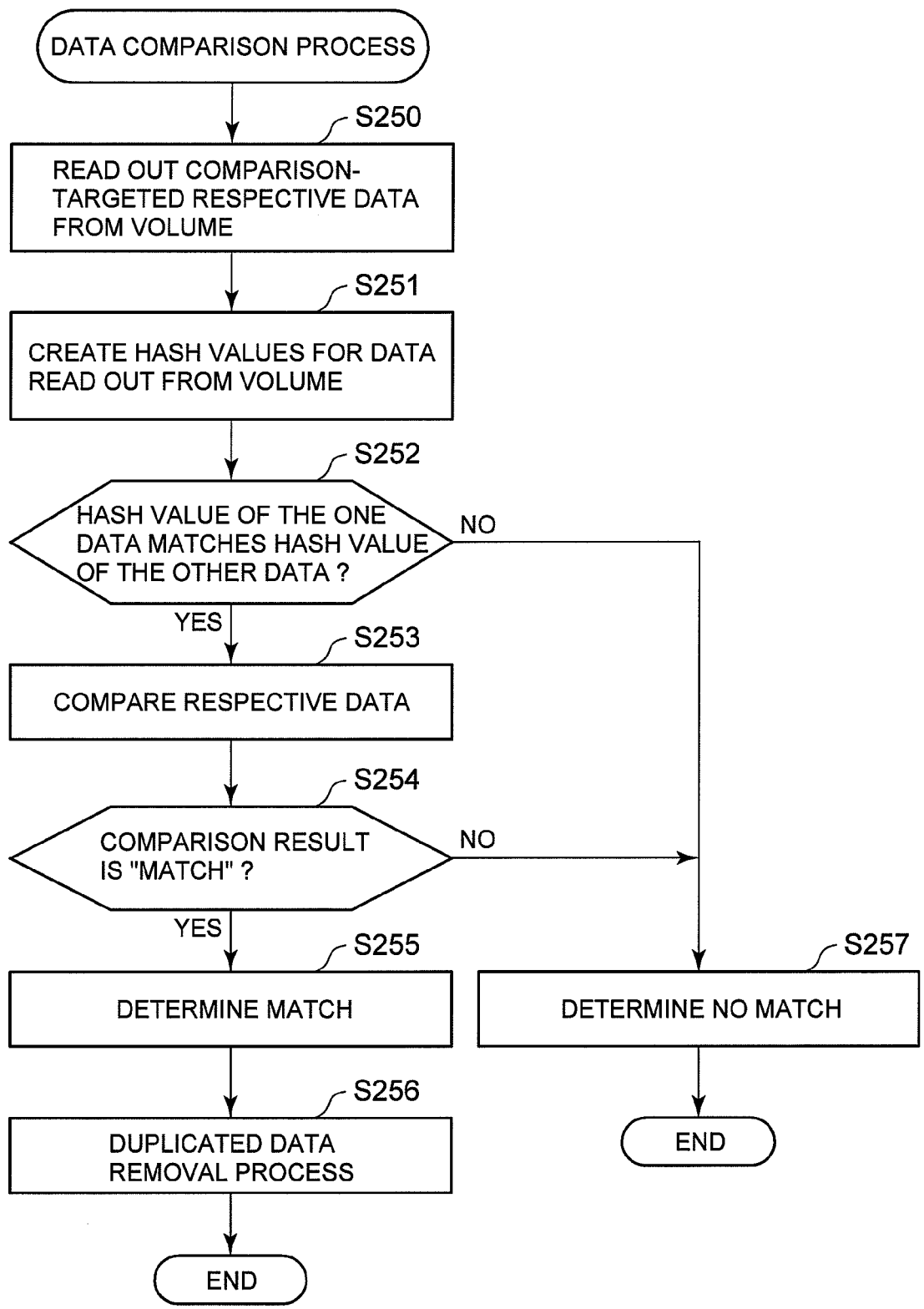
FIG. 26 is a flowchart showing a data comparison process, which is executed by a controller related to an eighth embodiment.

An eighth embodiment will be explained on the basis of FIG. 26. In this embodiment, a hash code is created only when carrying out duplicated data detection and removal. In the first embodiment, a case in which hash codes are set in write-data received from the host 30 and stored in the logical volume 212 was explained. In contrast to this, as shown in the flowchart of FIG. 26, this embodiment sets and compares hash codes only when needed.

The controller 10 reads out the comparison-targeted data from the logical volume 212 (S250), creates a hash code for the data read out from the logical volume 212, and sets the hash code in this data (S251). For example, a hash code is created by a hash code creation circuit 124 inside the BEPK120. The created hash code is sent to the MPPK130 and registered in the cache directory. The controller 10 determines whether or not the hash code of the one data matches the hash code of the other data (S252).

When the respective hash codes match (S252: YES), the controller 10 compares the two data (S253), and determines whether or not the comparison result is a "match" (S254). When the comparison result is "match" (S254: YES), the controller 10 determines that the two data match up (S255), and implements a duplicated data removal process (S256).

By contrast, when either the hash codes do not match (S252: NO) or when the comparison result is "no match" (S254: NO), a determination is made that these two data do not match (S257).

Configuring this embodiment like this exhibits the same effects as the first embodiment. In addition, since a hash code is created only when executing a data comparison process in this embodiment, there is no need to store hash code-attached data in the logical volume 212. Therefore, it is possible to make efficient use of the storage areas of the logical volume 212.

Furthermore, the present invention is not limited to the above-described embodiments. A person having ordinary skill in the art can make various additions and changes without departing from the scope of the present invention.

What is claimed is:

1. A storage system comprising:
a first storage controller including:
a first communications controller for carrying out data communications with a host computer;
a second communications controller for carrying out data communications with a storage device;
a cache memory that is used in the exchange of data between the first communications controller and the second communications controller, wherein said cache memory is used for both write and read operations;
a controller for controlling the first communications controller, the second communications controller and the cache memory respectively;
a determination data setting unit for setting, in respective data, and determination data for making a primary determination as to whether or not the respective data matches with other data;
a second storage controller including:
a duplicated data detector, which is for detecting whether or not a plurality of prescribed data is duplicated data, and which comprises a primary determination unit that makes a primary determination as to whether or not the respective prescribed data match with one another by comparing the respective determination data set in the respective prescribed data, and a secondary determination unit that compares the respective prescribed data and makes a secondary determination as to whether or not the respective prescribed data is duplicated data when the primary determination unit makes a primary determination that the respective prescribed data match with one another; and
a duplicated data processor that implements a preconfigured prescribed process for the duplicated data, when a secondary determination is that the respective prescribed data is duplicated data,
wherein at least the determination data setting unit and the secondary determination unit are configured as dedicated circuits that are separate from the controller,
wherein said determination data setting unit provides a hash value of write data received from said host computer to said cache memory,
wherein the first controller stores the write data received from said host computer with the hash value of the write data to the storage device, and the second storage controller receives the write data received from said host computer with the hash value of the write data, and
wherein the duplicated data processor stores only one data of the duplicated data to a differential backup volume coupled to the second storage controller, and deletes the other data of the duplicated data.

2. The storage system according to claim 1, wherein the duplicated data detector executes the primary determination by comparing the respective determination data set in the respective prescribed data when the respective prescribed data is transferred to the cache memory, and makes the secondary determination as to whether or not the respective prescribed data is the duplicated data by respectively reading out from the cache memory and comparing the respective prescribed data when the primary determination is that the respective prescribed data match with one another.

3. The storage system according to claim 1, wherein the duplicated data processor transfers any newer data of the respective prescribed data to a prescribed storage area when the respective prescribed data is not the duplicated data.

4. A storage system, comprising:
a first storage controller including:
a first communications controller for carrying out data communications with a host computer;
a second communications controller for carrying out data communications with a storage device;
a cache memory that is used in the exchange of data between the first communications controller and the second communications controller, wherein said cache memory is used for both write and read operations;
a controller for controlling the first communications controller, the second communications controller and the cache memory respectively;
a determination data setting unit for setting, in respective data, and determination data for making a primary determination as to whether or not the respective data matches with other data;
a second storage controller including:
a duplicated data detector, which is for detecting whether or not a plurality of prescribed data is duplicated data, and which comprises a primary determination unit that makes a primary determination as to whether or not the respective prescribed data match with one another by comparing the respective determination data set in the respective prescribed data, and a secondary determination unit that compares the respective prescribed data and makes a secondary determination as to whether or not the respective prescribed data is duplicated data when the primary determination unit makes a primary determination that the respective prescribed data match with one another; and
a duplicated data processor that implements a preconfigured prescribed process for the duplicated data, when a secondary determination is that the respective prescribed data is duplicated data,
wherein at least the determination data setting unit and the secondary determination unit are configured as dedicated circuits that are separate from the controller,
wherein said determination data setting unit provides a hash value of write data received from said host computer to said cache memory, wherein the first controller stores the write data received from said host computer with the hash value of the write data to the storage device, and the second storage controller receives the write data received from said host computer with the hash value of the write data, and
wherein the duplicated data processor stores only one data of the duplicated data to a differential backup volume coupled to the second storage controller, sets link information to the one data in the other data of the duplicated data, and wherein the second storage controller is located in a remote site from the first storage controller.

5. The storage system according to claim 4, wherein the duplicated data detector executes the primary determination by comparing the respective determination data set in the respective prescribed data when the respective prescribed data is transferred to the cache memory, and makes the secondary determination as to whether or not the respective prescribed data is the duplicated data by respectively reading out from the cache memory and comparing the respective prescribed data when the primary determination is that the respective prescribed data match with one another.

6. The storage system according to claim 4, wherein the duplicated data processor transfers any newer data of the respective prescribed data to a prescribed storage area when the respective prescribed data is not the duplicated data.

* * * * *